US012712608B2

(12) United States Patent
Lee et al.

(10) Patent No.: US 12,712,608 B2
(45) Date of Patent: Aug. 18, 2026

(54) PRECODING MATRICES FOR FULL-POWER UPLINK TRANSMISSIONS

(71) Applicant: QUALCOMM Incorporated, San Diego, CA (US)

(72) Inventors: Hyojin Lee, San Diego, CA (US); Yi Huang, San Diego, CA (US); Yu Zhang, San Diego, CA (US); Gokul Sridharan, Sunnyvale, CA (US); Kexin Xiao, Shanghai (CN)

(73) Assignee: QUALCOMM Incorproated, San Diego, CA (US)

( * ) Notice: Subject to any disclaimer, the term of this patent is extended or adjusted under 35 U.S.C. 154(b) by 58 days.

(21) Appl. No.: 18/839,900

(22) PCT Filed: Apr. 29, 2022

(86) PCT No.: PCT/CN2022/090263
§ 371 (c)(1),
(2) Date: Aug. 20, 2024

(87) PCT Pub. No.: WO2023/206358
PCT Pub. Date: Nov. 2, 2023

(65) Prior Publication Data
US 2025/0175220 A1 May 29, 2025

(51) Int. Cl.
*H04B 7/0456* (2017.01)
*H04W 52/14* (2009.01)

(52) U.S. Cl.
CPC ........ *H04B 7/0456* (2013.01); *H04W 52/146* (2013.01)

(58) Field of Classification Search
CPC ........................... H04B 7/0456; H04W 52/146
(Continued)

(56) References Cited

U.S. PATENT DOCUMENTS

2017/0141831 A1* 5/2017 Rico Alvarino ..... H04B 7/0626
2021/0314037 A1* 10/2021 Rahman .............. H04B 7/0639

FOREIGN PATENT DOCUMENTS

WO 2021031913 A1 2/2021
WO 2021070392 A1 4/2021
WO 2021101634 A1 5/2021

OTHER PUBLICATIONS

International Search Report and Written Opinion—PCT/CN2022/090263—ISA/EPO—Dec. 21, 2022.

(Continued)

*Primary Examiner* — Leila Malek
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration of a power mode for transmitting eight uplink transmission chains, wherein the power mode is one of a full-power mode or a non-full-power mode, and wherein at least a first set of precoding matrices is associated with the full-power mode and at least a second set of precoding matrices is associated with the non-full-power mode. The UE may receive an indication of a selected precoding matrix, wherein the indication is based at least in part on the configuration of the power mode and one of the first set of precoding matrices or the second set of precoding matrices. The UE may transmit the eight uplink transmission chains based at least in part on the selected precoding matrix. Numerous other aspects are described.

30 Claims, 24 Drawing Sheets

(58) Field of Classification Search
USPC .......................................................... 375/267
See application file for complete search history.

(56) References Cited

OTHER PUBLICATIONS

VIVO: “Feature Lead Summary on Full TX Power UL Transmission”, 3GPP TSG RAN WG1#96bis, R1-1905637, No. Xi’an, China, Apr. 8, 2019-Apr. 12, 2019, 25 Pages, Apr. 12, 2019.
CMCC: “Further Considerations on CSI-RS Pattern Design”, 3GPP TSG RAN WG1 Meeting #61Bis, R1-104116, Further Considerations on CSI-RS Pattern Design, 3rd Generation Partnership Project, Mobile Competence Centre, 650, Route Des Lucioles, F-06921 Sophia-Antipolis Cedex, France, vol. RAN WG1, No. Dresden, Germany, Jun. 28, 2010, Jun. 23, 2010, XP050449491, pp. 1-7, Section 2.
Supplementary European Search Report—EP22939207—Search Authority—The Hague—Jan. 23, 2026.

* cited by examiner

600

605
SRS Resource Set Indicator Field

| Bit field mapped to index | SRS resource set indication |
|---|---|
| 0 | SRI field and TPMI field are associated with the first SRS resource set;<br>Second SRI field and second TPMI field are reserved. |
| 1 | SRI field and TPMI field are associated with the second SRS resource set;<br>Second SRI field and second TPMI field are reserved. |
| 2 | SRI field and TPMI field are associated with the first SRS resource set;<br>Second SRI field and second TPMI field are associated with the second SRS resource set. |
| 3 | SRI field and TPMI field are associated with the first SRS resource set;<br>Second SRI field and second TPMI field are associated with the second SRS resource set. |

610
TPMI field for uplink 4Tx MIMO (First TPMI)

| Bit field index | codebookSubset = FC/PC/NC | codebookSubset = PC/NC | codebookSubset = NC |
|---|---|---|---|
| 0-3<br>4-9<br>10<br>11 | 1 layer: TPMI 0 – 3 (4)<br>2 layers: TPMI 0 – 5 (6)<br>3 layers: TPMI 0 (1)<br>4 layers: TPMI 0 (1) | 1 layer: TPMI 0 – 3 (4)<br>2 layers: TPMI 0 – 5 (6)<br>3 layers: TPMI 0 (1)<br>4 layers: TPMI 0 (1) | 1 layer: TPMI 0 – 3 (4)<br>2 layers: TPMI 0 – 5 (6)<br>3 layers: TPMI 0 (1)<br>4 layers: TPMI 0 (1) |
| 12-19<br>20-27<br>28-29<br>30-31 | 1 layer: 4 – 11 (8)<br>2 layers: 6 – 13 (8)<br>3 layers: 1 – 2 (2)<br>4 layers: 1 – 2 (2) | 1 layer: 4 – 11 (8)<br>2 layers: 6 – 13 (8)<br>3 layers: 1 – 2 (2)<br>4 layers: 1 – 2 (2) | |
| 32-47<br>48-55<br>56-59<br>60-61 | 1 layer: 12 – 27 (16)<br>2 layers: 14 – 21 (8)<br>3 layers: 3 – 6 (4)<br>4 layers: 3 – 4 (2) | | |

615
TPMI field for uplink 4Tx MIMO (Second TPMI)

| Bit field index | codebookSubset = FC/PC/NC | Bit field index | codebookSubset = PC/NC | Bit field index | codebookSubset = NC |
|---|---|---|---|---|---|
| 0-27<br>28-31 | 1 layer: TPMI 0 – 27 (28)<br>1 layer: Reserved | 0-11<br>12-15 | 1 layer: TPMI 0 – 11 (12)<br>1 layer: Reserved | 0-3<br>4-7 | 1 layer: TPMI 0 – 3 (4)<br>1 layer: Reserved |
| 0-21<br>22-31 | 2 layers: 0 – 21 (22)<br>2 layers: Reserved | 0-13<br>14-15 | 2 layers: 0 – 13 (14)<br>2 layers: Reserved | 0-5<br>6-7 | 2 layers: 0 – 5 (6)<br>2 layers: Reserved |
| 0-6<br>7-31 | 3 layers: 0 – 6 (7)<br>3 layers: Reserved | 0-2<br>3-15 | 3 layers: 0 – 2 (3)<br>3 layers: Reserved | 0<br>1-7 | 3 layers: 0 (1)<br>3 layers: Reserved |
| 0-4<br>5-31 | 4 layers: 0 – 4 (5)<br>4 layers: Reserved | 0-2<br>3-15 | 4 layers: 0 – 2 (3)<br>4 layers: Reserved | 0<br>1-7 | 4 layers: 0 (1)<br>4 layers: Reserved |

Uplink 4Tx MIMO Codebook – Rank 1

| TPMI Index | *W* (ordered from left to right in increasing order of TPMI index) | | | | | | | |
|---|---|---|---|---|---|---|---|---|
| 0 – 7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}0\\1\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8 – 15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\1\end{bmatrix}$ | $\frac{1}{2}\begin{bmatrix}1\\1\\j\\j\end{bmatrix}$ | $\frac{1}{2}\begin{bmatrix}1\\1\\-1\\-1\end{bmatrix}$ | $\frac{1}{2}\begin{bmatrix}1\\1\\-j\\-j\end{bmatrix}$ |
| 16 – 23 | $\frac{1}{2}\begin{bmatrix}1\\j\\1\\j\end{bmatrix}$ | $\frac{1}{2}\begin{bmatrix}1\\j\\j\\-1\end{bmatrix},$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ | $\frac{1}{2}\begin{bmatrix}1\\-1\\1\\-1\end{bmatrix}$ | $\frac{1}{2}\begin{bmatrix}1\\-1\\j\\-j\end{bmatrix}$ | $\frac{1}{2}\begin{bmatrix}1\\-1\\-1\\1\end{bmatrix}$ | $\frac{1}{2}\begin{bmatrix}1\\-1\\-j\\j\end{bmatrix}$ |
| 24 – 27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ | | | | |

Non-Coherent: TPMI 0-3
Partially Coherent: TPMI 4-11
Fully Coherent: TPMI 12-27

Uplink 4Tx MIMO Codebook – Rank 2

| TPMI index | W (ordered from left to right in increasing order of TPMI index) | | | |
|---|---|---|---|---|
| 0 – 3 | $\frac{1}{2}\begin{bmatrix}1&0\\0&1\\0&0\\0&0\end{bmatrix}$ | $\frac{1}{2}\begin{bmatrix}1&0\\0&0\\0&1\\0&0\end{bmatrix}$ | $\frac{1}{2}\begin{bmatrix}1&0\\0&0\\0&0\\0&1\end{bmatrix}$ | $\frac{1}{2}\begin{bmatrix}0&0\\1&0\\0&1\\0&0\end{bmatrix}$ |
| 4 – 7 | $\frac{1}{2}\begin{bmatrix}0&0\\1&0\\0&0\\0&1\end{bmatrix}$ | $\frac{1}{2}\begin{bmatrix}0&0\\0&0\\1&0\\0&1\end{bmatrix}$ | $\frac{1}{2}\begin{bmatrix}1&0\\0&1\\1&0\\0&-j\end{bmatrix}$ | $\frac{1}{2}\begin{bmatrix}1&0\\0&1\\1&0\\0&j\end{bmatrix}$ |
| 8 – 11 | $\frac{1}{2}\begin{bmatrix}1&0\\0&1\\-j&0\\0&1\end{bmatrix}$ | $\frac{1}{2}\begin{bmatrix}1&0\\0&1\\-j&0\\0&-1\end{bmatrix}$ | $\frac{1}{2}\begin{bmatrix}1&0\\0&1\\-1&0\\0&-j\end{bmatrix}$ | $\frac{1}{2}\begin{bmatrix}1&0\\0&1\\-1&0\\0&j\end{bmatrix}$ |
| 12 – 15 | $\frac{1}{2}\begin{bmatrix}1&0\\0&1\\j&0\\0&1\end{bmatrix}$ | $\frac{1}{2}\begin{bmatrix}1&0\\0&1\\j&0\\0&-1\end{bmatrix}$ | $\frac{1}{2\sqrt{2}}\begin{bmatrix}1&1\\1&1\\1&-1\\1&-1\end{bmatrix}$ | $\frac{1}{2\sqrt{2}}\begin{bmatrix}1&1\\1&1\\j&-j\\j&-j\end{bmatrix}$ |
| 16 – 19 | $\frac{1}{2\sqrt{2}}\begin{bmatrix}1&1\\j&j\\1&-1\\j&-j\end{bmatrix}$ | $\frac{1}{2\sqrt{2}}\begin{bmatrix}1&1\\j&j\\j&-j\\-1&1\end{bmatrix}$ | $\frac{1}{2\sqrt{2}}\begin{bmatrix}1&1\\-1&-1\\1&-1\\-1&1\end{bmatrix}$ | $\frac{1}{2\sqrt{2}}\begin{bmatrix}1&1\\-1&-1\\j&-j\\-j&j\end{bmatrix}$ |
| 20 – 21 | $\frac{1}{2\sqrt{2}}\begin{bmatrix}1&1\\-j&-j\\1&-1\\-j&j\end{bmatrix}$ | $\frac{1}{2\sqrt{2}}\begin{bmatrix}1&1\\-j&-j\\j&-j\\1&-1\end{bmatrix}$ | | |

Non-Coherent: TPMI 0-5
Partially Coherent: TPMI 6-13
Fully Coherent: TPMI 14-21

715
Uplink 4Tx MIMO Codebook – Rank 3

| TPMI index | *W* (ordered from left to right in increasing order of TPMI index) | | | |
|---|---|---|---|---|
| 0 – 3 | $\frac{1}{2}\begin{bmatrix}1&0&0\\0&1&0\\0&0&1\\0&0&0\end{bmatrix}$ | $\frac{1}{2}\begin{bmatrix}1&0&0\\0&1&0\\1&0&0\\0&0&1\end{bmatrix}$ | $\frac{1}{2}\begin{bmatrix}1&0&0\\0&1&0\\-1&0&0\\0&0&1\end{bmatrix}$ | $\frac{1}{2\sqrt{3}}\begin{bmatrix}1&1&1\\1&-1&1\\1&1&-1\\1&-1&-1\end{bmatrix}$ |
| 4 – 6 | $\frac{1}{2\sqrt{3}}\begin{bmatrix}1&1&1\\1&-1&1\\j&j&-j\\j&-j&-j\end{bmatrix}$ | $\frac{1}{2\sqrt{3}}\begin{bmatrix}1&1&1\\-1&1&-1\\1&1&-1\\-1&1&1\end{bmatrix}$ | $\frac{1}{2\sqrt{3}}\begin{bmatrix}1&1&1\\-1&1&-1\\j&j&-j\\-j&j&j\end{bmatrix}$ | |

Non-Coherent: TPMI 0
Partially Coherent: TPMI 1-2
Fully Coherent: TPMI 3-6

Uplink 4Tx MIMO Codebook – Rank 4

| TPMI index | *W* (ordered from left to right in increasing order of TPMI index) | | | |
|---|---|---|---|---|
| 0 – 3 | $\frac{1}{2}\begin{bmatrix}1&0&0&0\\0&1&0&0\\0&0&1&0\\0&0&0&1\end{bmatrix}$ | $\frac{1}{2\sqrt{2}}\begin{bmatrix}1&1&0&0\\0&0&1&1\\1&-1&0&0\\0&0&1&-1\end{bmatrix}$ | $\frac{1}{2\sqrt{2}}\begin{bmatrix}1&1&0&0\\0&0&1&1\\j&-j&0&0\\0&0&-j&-j\end{bmatrix}$ | $\frac{1}{4}\begin{bmatrix}1&1&1&1\\1&-1&1&-1\\1&1&-1&-1\\1&-1&-1&1\end{bmatrix}$ |
| 4 | $\frac{1}{4}\begin{bmatrix}1&1&1&1\\1&-1&1&-1\\j&j&-j&-j\\j&-j&-j&j\end{bmatrix}$ | | | |

Non-Coherent: TPMI 0

Partially Coherent: TPMI 1-2

Fully Coherent: TPMI 3-4

Types of Default 8Tx Precoders

| Rank 1 | Rank 2 | Rank 3 | Rank 4 |
|---|---|---|---|
| Type 1: $\frac{1}{\sqrt{2}}\begin{bmatrix} W_{4Tx,r=1} \\ 0 \end{bmatrix}$<br>Type 2: $\frac{1}{\sqrt{2}}\begin{bmatrix} 0 \\ W_{4Tx,r=1} \end{bmatrix}$ | Type 1: $\frac{1}{\sqrt{2}}\begin{bmatrix} W_{4Tx,r=2} \\ 0 \end{bmatrix}$<br>Type 2: $\frac{1}{\sqrt{2}}\begin{bmatrix} 0 \\ W_{4Tx,r=2} \end{bmatrix}$<br>Type 3: $\frac{1}{\sqrt{2}}\begin{bmatrix} W_{4Tx,r=1} & 0 \\ 0 & W'_{4Tx,r=1} \end{bmatrix}$ | Type 1: $\frac{1}{\sqrt{2}}\begin{bmatrix} W_{4Tx,r=3} \\ 0 \end{bmatrix}$<br>Type 2: $\frac{1}{\sqrt{2}}\begin{bmatrix} 0 \\ W_{4Tx,r=3} \end{bmatrix}$<br>Type 3: $\frac{1}{\sqrt{2}}\begin{bmatrix} W_{4Tx,r=2} & 0 \\ 0 & W_{4Tx,r=1} \end{bmatrix}$<br>Type 4: $\frac{1}{\sqrt{2}}\begin{bmatrix} W_{4Tx,r=1} & 0 \\ 0 & W_{4Tx,r=2} \end{bmatrix}$ | Type 1: $\frac{1}{\sqrt{2}}\begin{bmatrix} W_{4Tx,r=4} \\ 0 \end{bmatrix}$<br>Type 2: $\frac{1}{\sqrt{2}}\begin{bmatrix} 0 \\ W_{4Tx,r=4} \end{bmatrix}$<br>Type 3: $\frac{1}{\sqrt{2}}\begin{bmatrix} W_{4Tx,r=2} & 0 \\ 0 & W'_{4Tx,r=2} \end{bmatrix}$<br>Type 4: $\frac{1}{\sqrt{2}}\begin{bmatrix} W_{4Tx,r=3} & 0 \\ 0 & W_{4Tx,r=1} \end{bmatrix}$<br>Type 5: $\frac{1}{\sqrt{2}}\begin{bmatrix} W_{4Tx,r=1} & 0 \\ 0 & W_{4Tx,r=3} \end{bmatrix}$ |

| Rank 5 | Rank 6 | Rank 7 | Rank 8 |
|---|---|---|---|
| Type 1: $\frac{1}{\sqrt{2}}\begin{bmatrix} W_{4Tx,r=3} & 0 \\ 0 & W_{4Tx,r=2} \end{bmatrix}$<br>Type 2: $\frac{1}{\sqrt{2}}\begin{bmatrix} W_{4Tx,r=2} & 0 \\ 0 & W_{4Tx,r=3} \end{bmatrix}$<br>Type 3: $\frac{1}{\sqrt{2}}\begin{bmatrix} W_{4Tx,r=4} & 0 \\ 0 & W_{4Tx,r=1} \end{bmatrix}$<br>Type 4: $\frac{1}{\sqrt{2}}\begin{bmatrix} W_{4Tx,r=1} & 0 \\ 0 & W_{4Tx,r=4} \end{bmatrix}$ | Type 1: $\frac{1}{\sqrt{2}}\begin{bmatrix} W_{4Tx,r=3} & 0 \\ 0 & W'_{4Tx,r=3} \end{bmatrix}$<br>Type 2: $\frac{1}{\sqrt{2}}\begin{bmatrix} W_{4Tx,r=4} & 0 \\ 0 & W_{4Tx,r=2} \end{bmatrix}$<br>Type 3: $\frac{1}{\sqrt{2}}\begin{bmatrix} W_{4Tx,r=2} & 0 \\ 0 & W_{4Tx,r=4} \end{bmatrix}$ | Type 1: $\frac{1}{\sqrt{2}}\begin{bmatrix} W_{4Tx,r=4} & 0 \\ 0 & W_{4Tx,r=3} \end{bmatrix}$<br>Type 2: $\frac{1}{\sqrt{2}}\begin{bmatrix} W_{4Tx,r=3} & 0 \\ 0 & W_{4Tx,r=4} \end{bmatrix}$ | Type 1: $\frac{1}{\sqrt{2}}\begin{bmatrix} W_{4Tx,r=4} & 0 \\ 0 & W'_{4Tx,r=4} \end{bmatrix}$ |

| | Additional precoding matrices for NC FP mode 1 |
|---|---|
| Rank 1 | $\frac{1}{\sqrt{2}}\begin{bmatrix}\mathbf{W}_{4Tx,r=1}\\ \mathbf{W}'_{4Tx,r=1}\end{bmatrix}$,<br>$\mathbf{W}_{4Tx,r=1} = \mathbf{W}'_{4Tx,r=1} = \frac{1}{2}[1,1,j,j]^T$ (4Tx rank-1 TPMI 13) |
| Rank 2 | $\frac{1}{\sqrt{2}}\begin{bmatrix}\mathbf{W}_{4Tx,r=1} & \mathbf{0}\\ \mathbf{0} & \mathbf{W}'_{4Tx,r=1}\end{bmatrix}$,<br>$\mathbf{W}_{4Tx,r=1} = \mathbf{W}'_{4Tx,r=1} = \frac{1}{2}[1,1,j,j]^T$ (4Tx rank-1 TPMI 13) |
| Rank 3 | $\frac{1}{\sqrt{2}}\begin{bmatrix}\mathbf{W}_{4Tx,r=2} & \mathbf{0}\\ \mathbf{0} & \mathbf{W}_{4Tx,r=1}\end{bmatrix}$ (or $\frac{1}{\sqrt{2}}\begin{bmatrix}\mathbf{W}_{4Tx,r=1} & \mathbf{0}\\ \mathbf{0} & \mathbf{W}_{4Tx,r=2}\end{bmatrix}$),<br>$\mathbf{W}_{4Tx,r=1} = \frac{1}{2}[1,1,j,j]^T$ (4Tx rank-1 TPMI 13)<br>$\mathbf{W}_{4Tx,r=2} = \frac{1}{2}\begin{bmatrix}1,0,1,0\\ 0,1,0,-j\end{bmatrix}^T$ (4Tx rank-2 TPMI 6) |
| Rank 4 | $\frac{1}{\sqrt{2}}\begin{bmatrix}\mathbf{W}_{4Tx,r=2} & \mathbf{0}\\ \mathbf{0} & \mathbf{W}'_{4Tx,r=2}\end{bmatrix}$,<br>$\mathbf{W}_{4Tx,r=2} = \mathbf{W}'_{4Tx,r=2} = \frac{1}{2}\begin{bmatrix}1,0,1,0\\ 0,1,0,-j\end{bmatrix}^T$ (4Tx rank-2 TPMI 6) |

| | Additional precoding matrices for NC FP mode 1 |
|---|---|
| Rank 5 | $\frac{1}{\sqrt{2}}\begin{bmatrix} \mathbf{W}_{4Tx,r=3} & \mathbf{0} \\ \mathbf{0} & \mathbf{W}_{4Tx,r=2} \end{bmatrix}$ (or $\frac{1}{\sqrt{2}}\begin{bmatrix} \mathbf{W}_{4Tx,r=2} & \mathbf{0} \\ \mathbf{0} & \mathbf{W}_{4Tx,r=3} \end{bmatrix}$),<br>$\mathbf{W}_{4Tx,r=2} = \frac{1}{2}\begin{bmatrix} 1,0,1,0 \\ 0,1,0,-j \end{bmatrix}^T$ (4Tx rank-2 TPMI 6)<br>$\mathbf{W}_{4Tx,r=3} = \frac{1}{2}\begin{bmatrix} 1,0,1,0 \\ 0,1,0,0 \\ 0,0,0,1 \end{bmatrix}^T$ (4Tx rank-3 TPMI 1) |
| Rank 6 | $\frac{1}{\sqrt{2}}\begin{bmatrix} \mathbf{W}_{4Tx,r=3} & \mathbf{0} \\ \mathbf{0} & \mathbf{W}'_{4Tx,r=3} \end{bmatrix}$,<br>$\mathbf{W}_{4Tx,r=3} = \mathbf{W}'_{4Tx,r=3} = \frac{1}{2}\begin{bmatrix} 1,0,1,0 \\ 0,1,0,-j \end{bmatrix}^T$ (4Tx rank-3 TPMI 1) |
| Rank 7 | $\frac{1}{\sqrt{2}}\begin{bmatrix} \mathbf{W}_{4Tx,r=4} & \mathbf{0} \\ \mathbf{0} & \mathbf{W}_{4Tx,r=3} \end{bmatrix}$ (or $\frac{1}{\sqrt{2}}\begin{bmatrix} \mathbf{W}_{4Tx,r=3} & \mathbf{0} \\ \mathbf{0} & \mathbf{W}_{4Tx,r=4} \end{bmatrix}$),<br>$\mathbf{W}_{4Tx,r=3} = \frac{1}{2}\begin{bmatrix} 1,0,1,0 \\ 0,1,0,0 \\ 0,0,0,1 \end{bmatrix}^T$ (4Tx rank-3 TPMI 1)<br>$\mathbf{W}_{4Tx,r=4} = \frac{1}{2}\begin{bmatrix} 1,0,0,0 \\ 0,1,0,0 \\ 0,0,1,0 \\ 0,0,0,1 \end{bmatrix}^T$ (4Tx rank-4 TPMI 0) |
| Rank 8 | NA (Full power transmission is already supported with default precoding matrix with rank-8.) |

| | Additional precoding matrices for PC-2 FP mode 1 |
|---|---|
| Rank 1 | $\frac{1}{\sqrt{2}}\begin{bmatrix}\mathbf{W}_{4Tx,r=1}\\ \mathbf{W}'_{4Tx,r=1}\end{bmatrix}$, $\mathbf{W}_{4Tx,r=1}, \mathbf{W}'_{4Tx,r=1} \in \{\frac{1}{2}[1,1,1,1]^T, \frac{1}{2}[1,1,j,j]^T, \frac{1}{2}[1,1,-1,-1]^T, \frac{1}{2}[1,1,-j,-j]^T\}$ (4Tx rank-1 TPMI 12-15) |
| Rank 2 | $\frac{1}{\sqrt{2}}\begin{bmatrix}\mathbf{W}_{4Tx,r=1} & \mathbf{0}\\ \mathbf{0} & \mathbf{W}'_{4Tx,r=1}\end{bmatrix}$, $\mathbf{W}_{4Tx,r=1}, \mathbf{W}'_{4Tx,r=1} \in \{\frac{1}{2}[1,1,1,1]^T, \frac{1}{2}[1,1,j,j]^T, \frac{1}{2}[1,1,-1,-1]^T, \frac{1}{2}[1,1,-j,-j]^T\}$ (4Tx rank-1 TPMI 12-15) |
| Rank 3 | $\frac{1}{\sqrt{2}}\begin{bmatrix}\mathbf{W}_{4Tx,r=2} & \mathbf{0}\\ \mathbf{0} & \mathbf{W}_{4Tx,r=1}\end{bmatrix}$ (or $\frac{1}{\sqrt{2}}\begin{bmatrix}\mathbf{W}_{4Tx,r=1} & \mathbf{0}\\ \mathbf{0} & \mathbf{W}_{4Tx,r=2}\end{bmatrix}$), $\mathbf{W}_{4Tx,r=1} \in \{\frac{1}{2}[1,1,1,1]^T, \frac{1}{2}[1,1,j,j]^T, \frac{1}{2}[1,1,-1,-1]^T, \frac{1}{2}[1,1,-j,-j]^T\}$, $\mathbf{W}_{4Tx,r=2} \in$ Rank-2 PC Codebook (4Tx rank-2 TPMI 6-13) |
| Rank 4-8 | NA (Full power transmission is already supported with default PC-2 precoding matrices with rank 4-8) |

| | Additional precoding matrices for PC-4 FP mode 1 |
|---|---|
| Rank 1 | $\frac{1}{\sqrt{2}}\begin{bmatrix}\mathbf{W}_{4Tx,r=1}\\ \mathbf{W}'_{4Tx,r=1}\end{bmatrix}$, $\mathbf{W}_{4Tx,r=1}, \mathbf{W}'_{4Tx,r=1} \in$ Rank-1 FC Codebook (4Tx rank-1 TPMI 12-27) |
| Rank 2-8 | NA (Full power transmission is already supported with default PC-4 precoding matrices with rank 2-8) |

Figure 12:
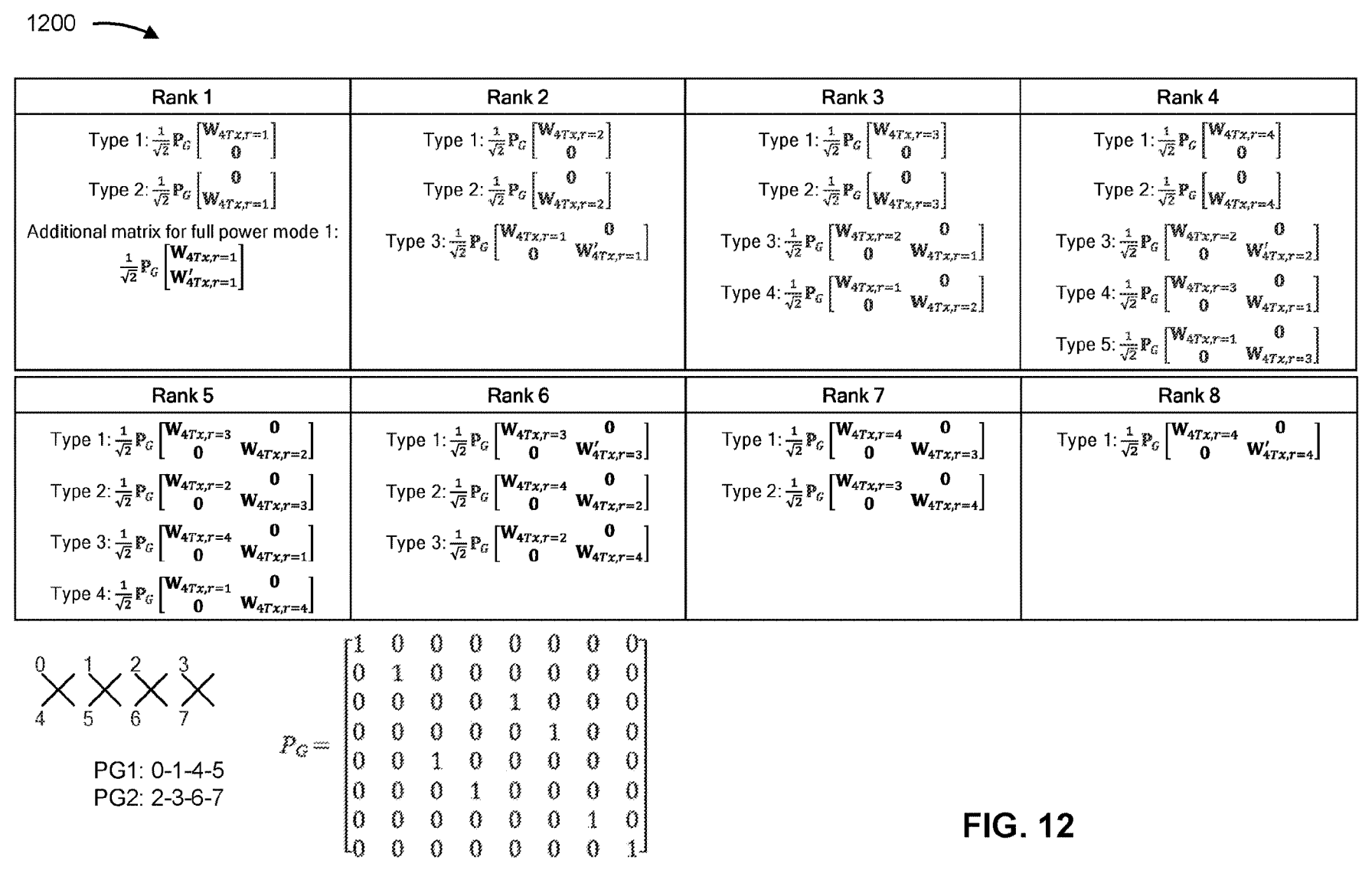

| Rank 1 | Rank 2 | Rank 3 | Rank 4 |
|---|---|---|---|
| Type 1: $\frac{1}{\sqrt{2}}P_G\begin{bmatrix}W_{4Tx,r=1}\\0\end{bmatrix}$<br>Type 2: $\frac{1}{\sqrt{2}}P_G\begin{bmatrix}0\\W_{4Tx,r=1}\end{bmatrix}$<br>Additional matrix for full power mode 1: $\frac{1}{\sqrt{2}}P_G\begin{bmatrix}\mathbf{W}_{4Tx,r=1}\\\mathbf{W}'_{4Tx,r=1}\end{bmatrix}$ | Type 1: $\frac{1}{\sqrt{2}}P_G\begin{bmatrix}W_{4Tx,r=2}\\0\end{bmatrix}$<br>Type 2: $\frac{1}{\sqrt{2}}P_G\begin{bmatrix}0\\W_{4Tx,r=2}\end{bmatrix}$<br>Type 3: $\frac{1}{\sqrt{2}}P_G\begin{bmatrix}W_{4Tx,r=1}&0\\0&W'_{4Tx,r=1}\end{bmatrix}$ | Type 1: $\frac{1}{\sqrt{2}}P_G\begin{bmatrix}W_{4Tx,r=3}\\0\end{bmatrix}$<br>Type 2: $\frac{1}{\sqrt{2}}P_G\begin{bmatrix}0\\W_{4Tx,r=3}\end{bmatrix}$<br>Type 3: $\frac{1}{\sqrt{2}}P_G\begin{bmatrix}W_{4Tx,r=2}&0\\0&W_{4Tx,r=1}\end{bmatrix}$<br>Type 4: $\frac{1}{\sqrt{2}}P_G\begin{bmatrix}W_{4Tx,r=1}&0\\0&W_{4Tx,r=2}\end{bmatrix}$ | Type 1: $\frac{1}{\sqrt{2}}P_G\begin{bmatrix}W_{4Tx,r=4}\\0\end{bmatrix}$<br>Type 2: $\frac{1}{\sqrt{2}}P_G\begin{bmatrix}0\\W_{4Tx,r=4}\end{bmatrix}$<br>Type 3: $\frac{1}{\sqrt{2}}P_G\begin{bmatrix}W_{4Tx,r=2}&0\\0&W'_{4Tx,r=2}\end{bmatrix}$<br>Type 4: $\frac{1}{\sqrt{2}}P_G\begin{bmatrix}W_{4Tx,r=3}&0\\0&W_{4Tx,r=1}\end{bmatrix}$<br>Type 5: $\frac{1}{\sqrt{2}}P_G\begin{bmatrix}W_{4Tx,r=1}&0\\0&W_{4Tx,r=3}\end{bmatrix}$ |

| Rank 5 | Rank 6 | Rank 7 | Rank 8 |
|---|---|---|---|
| Type 1: $\frac{1}{\sqrt{2}}P_G\begin{bmatrix}\mathbf{W}_{4Tx,r=3}&\mathbf{0}\\\mathbf{0}&\mathbf{W}_{4Tx,r=2}\end{bmatrix}$<br>Type 2: $\frac{1}{\sqrt{2}}P_G\begin{bmatrix}\mathbf{W}_{4Tx,r=2}&\mathbf{0}\\\mathbf{0}&\mathbf{W}_{4Tx,r=3}\end{bmatrix}$<br>Type 3: $\frac{1}{\sqrt{2}}P_G\begin{bmatrix}\mathbf{W}_{4Tx,r=4}&\mathbf{0}\\\mathbf{0}&\mathbf{W}_{4Tx,r=1}\end{bmatrix}$<br>Type 4: $\frac{1}{\sqrt{2}}P_G\begin{bmatrix}\mathbf{W}_{4Tx,r=1}&\mathbf{0}\\\mathbf{0}&\mathbf{W}_{4Tx,r=4}\end{bmatrix}$ | Type 1: $\frac{1}{\sqrt{2}}P_G\begin{bmatrix}\mathbf{W}_{4Tx,r=3}&\mathbf{0}\\\mathbf{0}&\mathbf{W}'_{4Tx,r=3}\end{bmatrix}$<br>Type 2: $\frac{1}{\sqrt{2}}P_G\begin{bmatrix}\mathbf{W}_{4Tx,r=4}&\mathbf{0}\\\mathbf{0}&\mathbf{W}_{4Tx,r=2}\end{bmatrix}$<br>Type 3: $\frac{1}{\sqrt{2}}P_G\begin{bmatrix}\mathbf{W}_{4Tx,r=2}&\mathbf{0}\\\mathbf{0}&\mathbf{W}_{4Tx,r=4}\end{bmatrix}$ | Type 1: $\frac{1}{\sqrt{2}}P_G\begin{bmatrix}\mathbf{W}_{4Tx,r=4}&\mathbf{0}\\\mathbf{0}&\mathbf{W}_{4Tx,r=3}\end{bmatrix}$<br>Type 2: $\frac{1}{\sqrt{2}}P_G\begin{bmatrix}\mathbf{W}_{4Tx,r=3}&\mathbf{0}\\\mathbf{0}&\mathbf{W}_{4Tx,r=4}\end{bmatrix}$ | Type 1: $\frac{1}{\sqrt{2}}P_G\begin{bmatrix}\mathbf{W}_{4Tx,r=4}&\mathbf{0}\\\mathbf{0}&\mathbf{W}'_{4Tx,r=4}\end{bmatrix}$ |

$$P_G=\begin{bmatrix}1&0&0&0&0&0&0&0\\0&1&0&0&0&0&0&0\\0&0&0&0&1&0&0&0\\0&0&0&0&0&1&0&0\\0&0&1&0&0&0&0&0\\0&0&0&1&0&0&0&0\\0&0&0&0&0&0&1&0\\0&0&0&0&0&0&0&1\end{bmatrix}$$

| Type Indicator | The first TPMI field | The second TPMI field | 8Tx Precoding matrix |
|---|---|---|---|
| 0 | 4Tx, 3 layers, TPMI 1 | Reserved | Rank-3, type 1: 1+0 |
| 1 | Reserved | 4Tx, 3 layers, TPMI 2 | Rank-3, type 2: 0+1 |
| 2 | 4Tx, 3 layers, TPMI 1 | 4Tx, 1 layer, TPMI 2 | Rank-4, type 4: 3+1 |
| 2 | 4Tx, 3 layers, TPMI 1 | 4Tx, 2 layers, TPMI 2 | Rank-5, type 1: 3+2 |
| 2 | 4Tx, 3 layers, TPMI 1 | 4Tx, 3 layers, TPMI 2 | Rank-6, type 1: 3+3 |
| 2 | 4Tx, 3 layers, TPMI 1 | 4Tx, 4 layers, TPMI 2 | Rank-7, type 2: 3+4 |
| 3 | 8Tx Full Power (FP) precoding matrix is indicated | | |
| 0 | 4Tx, 4 layers, TPMI 1 | Reserved | Rank-4, type 1: 4+0 |
| 1 | Reserved | 4Tx, 4 layers, TPMI 2 | Rank-4, type 2: 0+4 |
| 2 | 4Tx, 4 layers, TPMI 1 | 4Tx, 1 layer, TPMI 2 | Rank-5, type 3: 4+1 |
| 2 | 4Tx, 4 layers, TPMI 1 | 4Tx, 2 layers, TPMI 2 | Rank-6, type 2: 4+2 |
| 2 | 4Tx, 4 layers, TPMI 1 | 4Tx, 3 layers, TPMI 2 | Rank-7, type 1: 4+3 |
| 2 | 4Tx, 4 layers, TPMI 1 | 4Tx, 4 layers, TPMI 2 | Rank-8, type 1: 4+4 |
| 3 | 8Tx Full Power (FP) precoding matrix is indicated | | |

FIG. 13

PRECODING MATRICES FOR FULL-POWER UPLINK TRANSMISSIONS

CROSS-REFERENCE TO RELATED APPLICATION

This Patent Application is a 371 National Stage of PCT Application No. PCT/CN2022/090263 filed on Apr. 29, 2022, entitled "PRECODING MATRICES FOR FULL-POWER UPLINK TRANSMISSIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for precoding matrices for full-power uplink transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a network entity, a configuration of a power mode for transmitting eight uplink transmission chains, wherein the power mode is one of a full-power mode or a non-full-power mode, and wherein at least a first set of precoding matrices is associated with the full-power mode and at least a second set of precoding matrices is associated with the non-full-power mode. The method may include receiving, from the network entity, an indication of a selected precoding matrix associated with transmitting the eight uplink transmission chains, wherein the indication is based at least in part on the configuration of the power mode and one of the first set of precoding matrices or the second set of precoding matrices. The method may include transmitting the eight uplink transmission chains based at least in part on the selected precoding matrix.

Some aspects described herein relate to a method of wireless communication performed by a network entity. The method may include transmitting, to a UE, a configuration of a power mode for transmitting eight uplink transmission chains, wherein the power mode is one of a full-power mode or a non-full-power mode, and wherein at least a first set of precoding matrices is associated with the full-power mode and at least a second set of precoding matrices is associated with the non-full-power mode. The method may include transmitting, to the UE, an indication of a selected precoding matrix associated with transmitting the eight uplink transmission chains, wherein the indication is based at least in part on the configuration of the power mode and one of the first set of precoding matrices or the second set of precoding matrices. The method may include receiving, from the UE, the eight uplink transmission chains based at least in part on the selected precoding matrix.

Some aspects described herein relate to an apparatus for wireless communication at a UE. The apparatus may include a memory and one or more processors coupled to the memory. The one or more processors may be configured to receive, from a network entity, a configuration of a power mode for transmitting eight uplink transmission chains, wherein the power mode is one of a full-power mode or a non-full-power mode, and wherein at least a first set of precoding matrices is associated with the full-power mode and at least a second set of precoding matrices is associated with the non-full-power mode. The one or more processors may be configured to receive, from the network entity, an indication of a selected precoding matrix associated with transmitting the eight uplink transmission chains, wherein the indication is based at least in part on the configuration of the power mode and one of the first set of precoding matrices or the second set of precoding matrices. The one or more processors may be configured to transmit the eight uplink transmission chains based at least in part on the selected precoding matrix.

Some aspects described herein relate to an apparatus for wireless communication at a network entity. The apparatus may include a memory and one or more processors coupled to the memory. The one or more processors may be configured to transmit, to a UE, a configuration of a power mode for transmitting eight uplink transmission chains, wherein the power mode is one of a full-power mode or a non-fullpower mode, wherein at least a first set of precoding matrices is associated with the full-power mode and at least a second set of precoding matrices is associated with the non-full-power mode. The one or more processors may be configured to transmit, to the UE, an indication of a selected precoding matrix associated with transmitting the eight uplink transmission chains, wherein the indication is based at least in part on the configuration of the power mode and one of the first set of precoding matrices or the second set of precoding matrices. The one or more processors may be configured to receive, from the UE, the eight uplink transmission chains based at least in part on the selected precoding matrix.

Some aspects described herein relate to a non-transitory computer-readable medium that stores a set of instructions for wireless communication by a UE. The set of instructions, when executed by one or more processors of the UE, may cause the UE to receive, from a network entity, a configuration of a power mode for transmitting eight uplink transmission chains, wherein the power mode is one of a full-power mode or a non-full-power mode, and wherein at least a first set of precoding matrices is associated with the full-power mode and at least a second set of precoding matrices is associated with the non-full-power mode. The set of instructions, when executed by one or more processors of the UE, may cause the UE to receive, from the network entity, an indication of a selected precoding matrix associated with transmitting the eight uplink transmission chains, wherein the indication is based at least in part on the configuration of the power mode and one of the first set of precoding matrices or the second set of precoding matrices. The set of instructions, when executed by one or more processors of the UE, may cause the UE to transmit the eight uplink transmission chains based at least in part on the selected precoding matrix.

Some aspects described herein relate to a non-transitory computer-readable medium that stores a set of instructions for wireless communication by a network entity. The set of instructions, when executed by one or more processors of the network entity, may cause the network entity to transmit, to a UE, a configuration of a power mode for transmitting eight uplink transmission chains, wherein the power mode is one of a full-power mode or a non-full-power mode, wherein at least a first set of precoding matrices is associated with the full-power mode and at least a second set of precoding matrices is associated with the non-full-power mode. The set of instructions, when executed by one or more processors of the network entity, may cause the network entity to transmit, to the UE, an indication of a selected precoding matrix associated with transmitting the eight uplink transmission chains, wherein the indication is based at least in part on the configuration of the power mode and one of the first set of precoding matrices or the second set of precoding matrices. The set of instructions, when executed by one or more processors of the network entity, may cause the network entity to receive, from the UE, the eight uplink transmission chains based at least in part on the selected precoding matrix.

Some aspects described herein relate to an apparatus for wireless communication. The apparatus may include means for receiving, from a network entity, a configuration of a power mode for transmitting eight uplink transmission chains, wherein the power mode is one of a full-power mode or a non-full-power mode, and wherein at least a first set of precoding matrices is associated with the full-power mode and at least a second set of precoding matrices is associated with the non-full-power mode. The apparatus may include means for receiving, from the network entity, an indication of a selected precoding matrix associated with transmitting the eight uplink transmission chains, wherein the indication is based at least in part on the configuration of the power mode and one of the first set of precoding matrices or the second set of precoding matrices. The apparatus may include means for transmitting the eight uplink transmission chains based at least in part on the selected precoding matrix.

Some aspects described herein relate to an apparatus for wireless communication. The apparatus may include means for transmitting, to a UE, a configuration of a power mode for transmitting eight uplink transmission chains, wherein the power mode is one of a full-power mode or a non-full-power mode, and wherein at least a first set of precoding matrices is associated with the full-power mode and at least a second set of precoding matrices is associated with the non-full-power mode. The apparatus may include means for transmitting, to the UE, an indication of a selected precoding matrix associated with transmitting the eight uplink transmission chains, wherein the indication is based at least in part on the configuration of the power mode and one of the first set of precoding matrices or the second set of precoding matrices. The apparatus may include means for receiving, from the UE, the eight uplink transmission chains based at least in part on the selected precoding matrix.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6A-6C are diagrams illustrating an example of an SRS resource set indicator field and transmitted precoding matrix indicator fields associated with codebook-based uplink transmission, in accordance with the present disclosure.

FIGS. 7A-7D are diagrams illustrating an example of four uplink transmission chain multiple-input multiple-output (MIMO) codebooks associated with codebook-based uplink transmission, in accordance with the present disclosure.

FIG. 8 is a diagram illustrating an example of a default eight uplink transmission chain (8Tx) MIMO codebook associated with codebook-based uplink transmission, in accordance with the present disclosure.

FIGS. 9A-9B are diagrams illustrating an example of 8Tx MIMO full-power precoding matrices associated with codebook-based uplink transmission, in accordance with the present disclosure.

FIG. 10 is a diagram illustrating an example of 8Tx MIMO full-power precoding matrices associated with codebook-based uplink transmission, in accordance with the present disclosure.

FIG. 11 is a diagram illustrating an example of 8Tx MIMO full-power precoding matrices associated with codebook-based uplink transmission, in accordance with the present disclosure.

FIG. 12 is a diagram illustrating an example of an 8Tx MIMO codebook associated with a permutation matrix, in accordance with the present disclosure.

FIG. 13 is a diagram illustrating an example of signaling associated with an 8Tx MIMO codebook, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
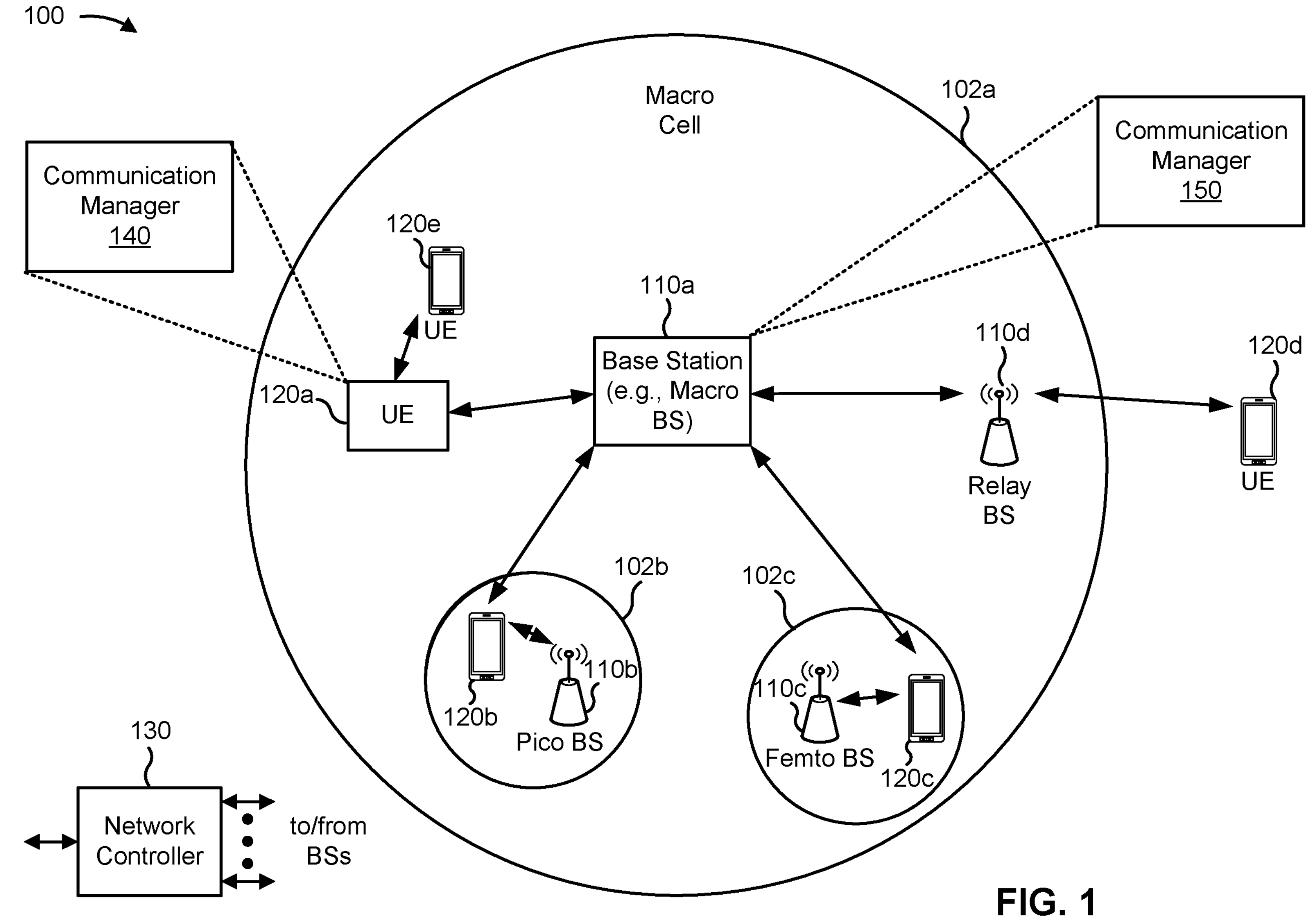
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although the base station 110 is shown as an integral unit in FIG. 1, aspects of the disclosure are not so limited. In some other aspects, the functionality of the base station 110 may be disaggregated according to an open radio access network (O-RAN) architecture or the like, which is described in more detail in connection with FIG. 3. As used herein, "network entity" may refer to a base station 110 or to a disaggregated component of the base station 110. Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a “Sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHz-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term “sub-6 GHz” or the like, if used herein, may broadly represent frequencies that may be less than 6 GHZ, may be within FR1, or may include mid-band frequencies. Further, unless specifically stated otherwise, it should be understood that the term “millimeter wave” or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network entity, a configuration of a power mode for transmitting eight uplink transmission chains, wherein the power mode is one of a full-power mode or a non-full-power mode, and wherein at least a first set of precoding matrices is associated with the full-power mode and at least a second set of precoding matrices is associated with the non-full-power mode; receive, from the network entity, an indication of a selected precoding matrix associated with transmitting the eight uplink transmission chains, wherein the indication is based at least in part on the configuration of the power mode and one of the first set of precoding matrices or the second set of precoding matrices; and transmit the eight uplink transmission chains based at least in part on the selected precoding matrix. Additionally, or alternatively, the communication manager 140 may perform one or more other operations described herein.

In some aspects, the network entity described elsewhere herein is associated with the base station 110. The network entity may include a communication manager 150. As described in more detail elsewhere herein, the communication manager 150 may transmit, to a UE (e.g., UE 120), a configuration of a power mode for transmitting eight uplink transmission chains, wherein the power mode is one of a full-power mode or a non-full-power mode, and wherein at least a first set of precoding matrices is associated with the full-power mode and at least a second set of precoding matrices is associated with the non-full-power mode; transmit, to the UE, an indication of a selected precoding matrix associated with transmitting the eight uplink transmission chains, wherein the indication is based at least in part on the configuration of the power mode and one of the first set of precoding matrices or the second set of precoding matrices; and receive, from the UE, the eight uplink transmission chains based at least in part on the selected precoding matrix. Additionally, or alternatively, the communication manager 150 may perform one or more other operations described herein.

As indicated above, FIG. 1 is provided as an example. Other examples may differ from what is described with regard to FIG. 1.

Figure 2:
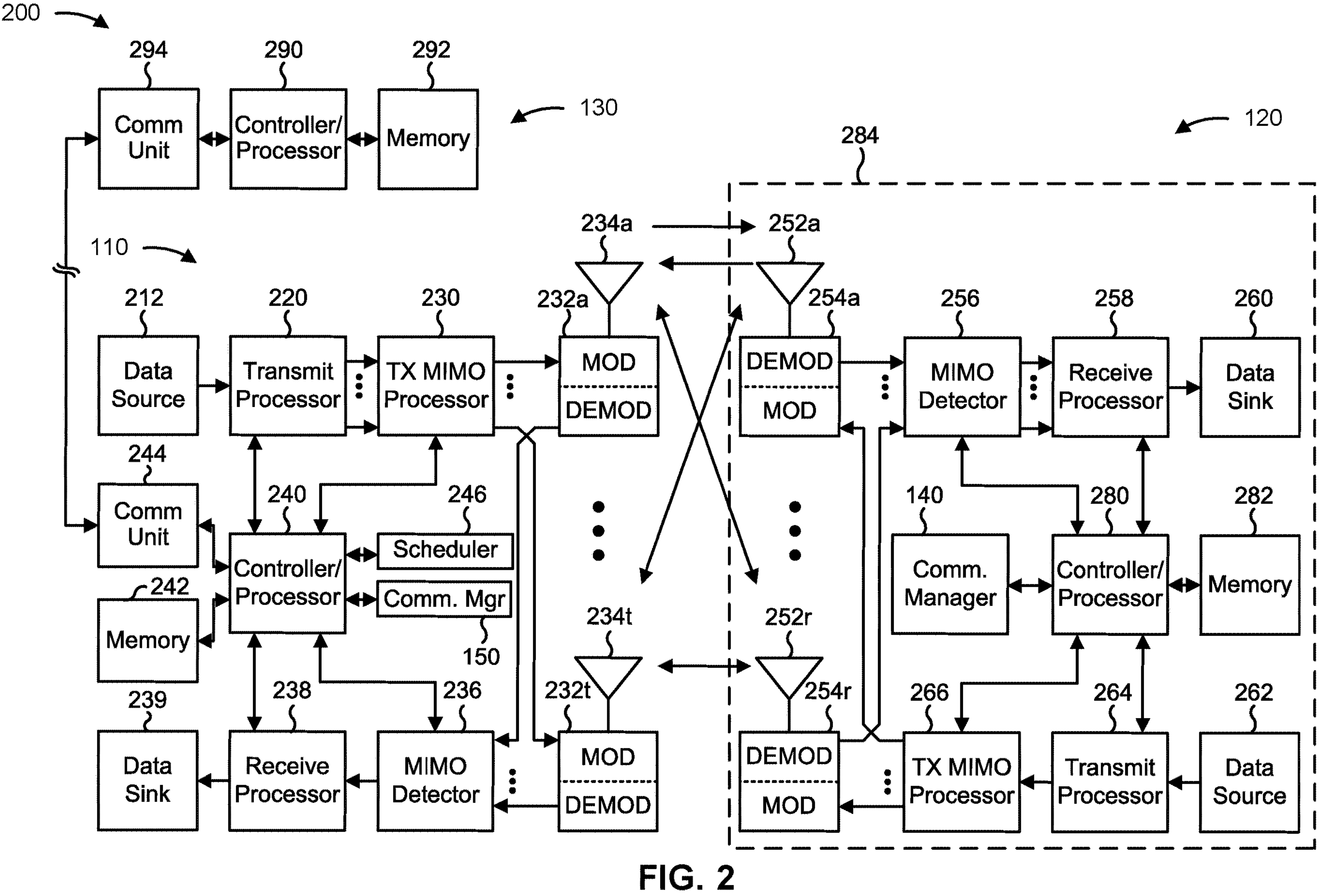
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-18).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-18).

The controller/processor 240 of the base station 110, the controller/processor 280 of the UE 120, and/or any other component(s) of FIG. 2 may perform one or more techniques associated with precoding matrices for full-power uplink transmissions, as described in more detail elsewhere herein. In some aspects, the network entity described herein is the base station 110, is included in the base station 110, or includes one or more components of the base station 110 shown in FIG. 2. The controller/processor 240 of the base station 110, the controller/processor 280 of the UE 120, and/or any other component(s) of FIG. 2 may perform or direct operations of, for example, process 1500 of FIG. 15, process 1600 of FIG. 16, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1500 of FIG. 15, process 1600 of FIG. 16, and/or other processes as described herein. In some examples, executing instructions may include running the instructions, converting the instructions, compiling the instructions, and/or interpreting the instructions, among other examples.

In some aspects, the UE 120 includes means for receiving, from a network entity, a configuration of a power mode for transmitting eight uplink transmission chains, wherein the power mode is one of a full-power mode or a non-full-power mode, and wherein at least a first set of precoding matrices is associated with the full-power mode and at least a second set of precoding matrices is associated with the non-full-power mode; means for receiving, from the network entity, an indication of a selected precoding matrix associated with transmitting the eight uplink transmission chains, wherein the indication is based at least in part on the configuration of the power mode and one of the first set of precoding matrices or the second set of precoding matrices; and/or means for transmitting the eight uplink transmission chains based at least in part on the selected precoding matrix. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity described elsewhere herein, which may be associated with the base station 110, includes means for transmitting, to a UE (e.g., UE 120), a configuration of a power mode for transmitting eight uplink transmission chains, wherein the power mode is one of a full-power mode or a non-full-power mode, and wherein at least a first set of precoding matrices is associated with the full-power mode and at least a second set of precoding matrices is associated with the non-full-power mode; means for transmitting, to the UE, an indication of a selected precoding matrix associated with transmitting the eight uplink transmission chains, wherein the indication is based at least in part on the configuration of the power mode and one of the first set of precoding matrices or the second set of precoding matrices; and/or means for receiving, from the UE, the eight uplink transmission chains based at least in part on the selected precoding matrix. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
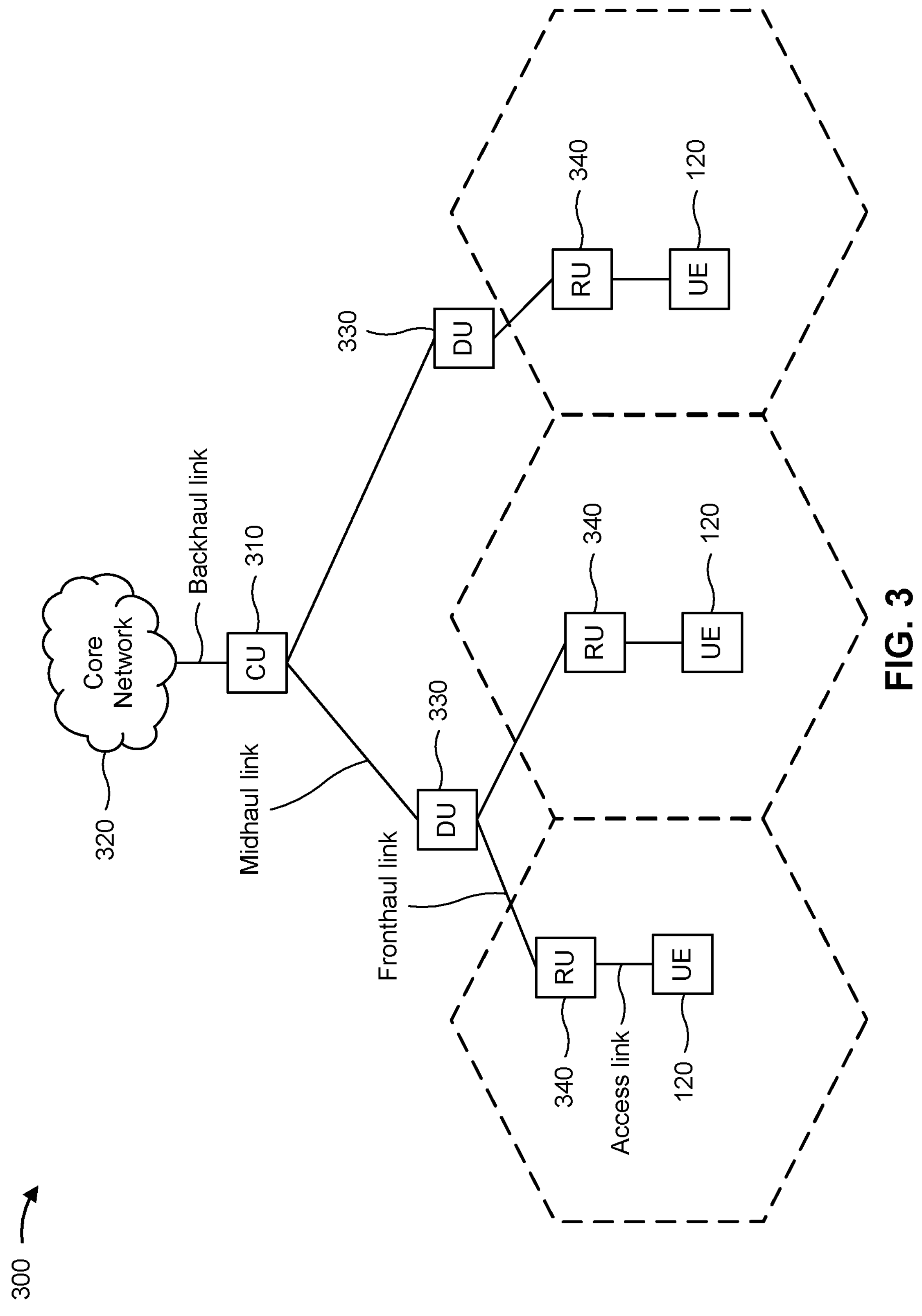
FIG. 3 is a diagram illustrating an example of an open radio access network architecture, in accordance with the present disclosure.

FIG. 3 is a diagram illustrating an example 300 of an O-RAN architecture, in accordance with the present disclosure. As shown in FIG. 3, the O-RAN architecture may include a centralized unit (CU) 310 that communicates with a core network 320 via a backhaul link. Furthermore, the CU 310 may communicate with one or more distributed units (DUs) 330 via respective midhaul links. The DUs 330 may each communicate with one or more radio units (RUs) 340 via respective fronthaul links, and the RUs 340 may each communicate with respective UEs 120 via radio frequency (RF) access links. The DUs 330 and the RUs 340 may also be referred to as O-RAN DUS (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Figure 4:
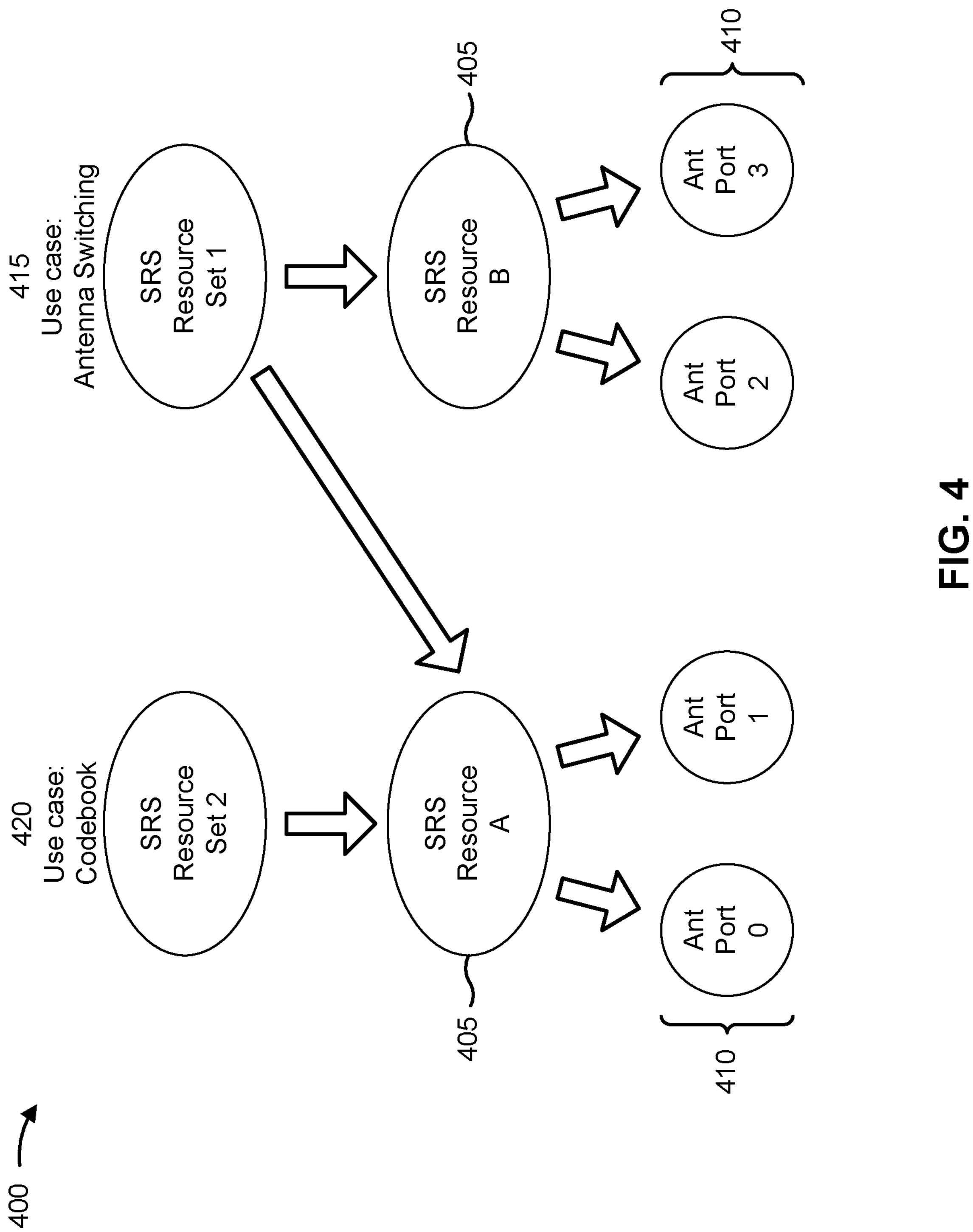
FIG. 4 is a diagram illustrating an example of sounding reference signal (SRS) resource sets, in accordance with the present disclosure.

FIG. 4 is a diagram illustrating an example 400 of sounding reference signal (SRS) resource sets, in accordance with the present disclosure.

A base station 110 may configure a UE 120 with one or more SRS resource sets to allocate resources for SRS transmissions by the UE 120. For example, a configuration for SRS resource sets may be indicated in an RRC message (e.g., an RRC configuration message or an RRC reconfiguration message). As shown by reference number 405, an SRS resource set may include one or more resources (e.g., shown as SRS resources), which may include time resources and/or frequency resources (e.g., a slot, a symbol, a resource block, and/or a periodicity for the time resources).

As shown by reference number 410, an SRS resource may include one or more antenna ports on which an SRS is to be transmitted (e.g., in a time-frequency resource). Thus, a configuration for an SRS resource set may indicate one or more time-frequency resources in which an SRS is to be transmitted and may indicate one or more antenna ports on which the SRS is to be transmitted in those time-frequency resources. In some aspects, the configuration for an SRS resource set may indicate a use case (e.g., in an SRS-SetUse information element) for the SRS resource set. For example, an SRS resource set may have a use case of antenna switching, codebook, non-codebook, or beam management.

An antenna switching SRS resource set may be used to indicate downlink channel state information (CSI) with reciprocity between an uplink and downlink channel. For example, when there is reciprocity between an uplink channel and a downlink channel, a base station 110 may use an antenna switching SRS (e.g., an SRS transmitted using a resource of an antenna switching SRS resource set) to acquire downlink CSI (e.g., to determine a downlink precoder to be used to communicate with the UE 120).

A codebook SRS resource set may be used to indicate uplink CSI when a base station 110 indicates an uplink precoder to the UE 120. For example, when the base station 110 is configured to indicate an uplink precoder to the UE 120 (e.g., using a precoder codebook), the base station 110 may use a codebook SRS (e.g., an SRS transmitted using a resource of a codebook SRS resource set) to acquire uplink CSI (e.g., to determine an uplink precoder to be indicated to the UE 120 and used by the UE 120 to communicate with the base station 110). In some aspects, virtual ports (e.g., a combination of two or more antenna ports) with a maximum transmit power may be supported at least for a codebook SRS. In some cases, when used for purposes of indicating uplink CSI for purposes of selecting a precoder or the like, the UE 120 may be configured with one or more SRS resource sets and one or more SRS resources within the SRS resource set via RRC signaling, and the UE 120 may receive an SRS resource indicator (SRI) via a downlink control information (DCI) communication indicating which SRS resource should be used for an uplink communication. For example, when the configured SRS resources included two SRS resources, the SRI may include a 0 or 1 bit in the DCI communication indicating which SRS resource should be used for an uplink transmission. In some aspects, a DCI communication may also include a transmitted precoding matrix indicator (TPMI) field indicating a precoding matrix that should be used for the uplink transmission. Aspects of a codebook SRS resource set are described in more detail in connection with FIGS. 5-7D.

A non-codebook SRS resource set may be used to indicate uplink CSI when the UE 120 selects an uplink precoder (e.g., instead of the base station 110 indicating an uplink precoder to be used by the UE 120). For example, when the UE 120 is configured to select an uplink precoder, the base station 110 may use a non-codebook SRS (e.g., an SRS transmitted using a resource of a non-codebook SRS resource set) to acquire uplink CSI. In this case, the non-codebook SRS may be precoded using a precoder selected by the UE 120 (e.g., which may be indicated to the base station 110).

A beam management SRS resource set may be used for indicating CSI for millimeter wave communications.

An SRS resource can be configured as periodic, semi-persistent (sometimes referred to as semi-persistent scheduling (SPS)), or aperiodic. A periodic SRS resource may be configured via a configuration message that indicates a periodicity of the SRS resource (e.g., a slot-level periodicity, where the SRS resources occurs every Y slots) and a slot offset. In some cases, a periodic SRS resource may always be activated, and may not be dynamically activated or deactivated. A semi-persistent SRS resource may also be configured via a configuration message that indicates a periodicity and a slot offset for the semi-persistent SRS resource, and may be dynamically activated and deactivated (e.g., using DCI or a MAC control element (MAC-CE)). An aperiodic SRS resource may be triggered dynamically, such as via DCI (e.g., UE-specific DCI or group common DCI) or a MAC-CE.

In some aspects, the UE 120 may be configured with a mapping between SRS ports (e.g., antenna ports) and corresponding SRS resources. The UE 120 may transmit an SRS on a particular SRS resource using an SRS port indicated in the configuration. In some aspects, an SRS resource may span N adjacent symbols within a slot (e.g., where N equals 1, 2, or 4). The UE 120 may be configured with X SRS ports (e.g., where X≤4). In some aspects, each of the X SRS ports may mapped to a corresponding symbol of the SRS resource and used for transmission of an SRS in that symbol.

As shown in FIG. 4, in some aspects, different SRS resource sets indicated to the UE 120 (e.g., having different use cases) may overlap (e.g., in time and/or in frequency, such as in the same slot). For example, as shown by reference number 415, a first SRS resource set (e.g., shown as SRS Resource Set 1) is shown as having an antenna switching use case. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1 and may be transmitted in SRS Resource B (e.g., a second time-frequency resource) using antenna port 2 and antenna port 3.

As shown by reference number 420, a second SRS resource set (e.g., shown as SRS Resource Set 2) may be a codebook use case. As shown, this example codebook SRS resource set includes only the first SRS resource (shown as SRS Resource A). Thus, codebook SRSs may be transmitted in SRS Resource A (e.g., the first time-frequency resource) using antenna port 0 and antenna port 1. In this case, the UE 120 may not transmit codebook SRSs in SRS Resource B (e.g., the second time-frequency resource) using antenna port 2 and antenna port 3.

As indicated above, FIG. 4 is provided as an example. Other examples may differ from what is described with regard to FIG. 4.

Figure 5:
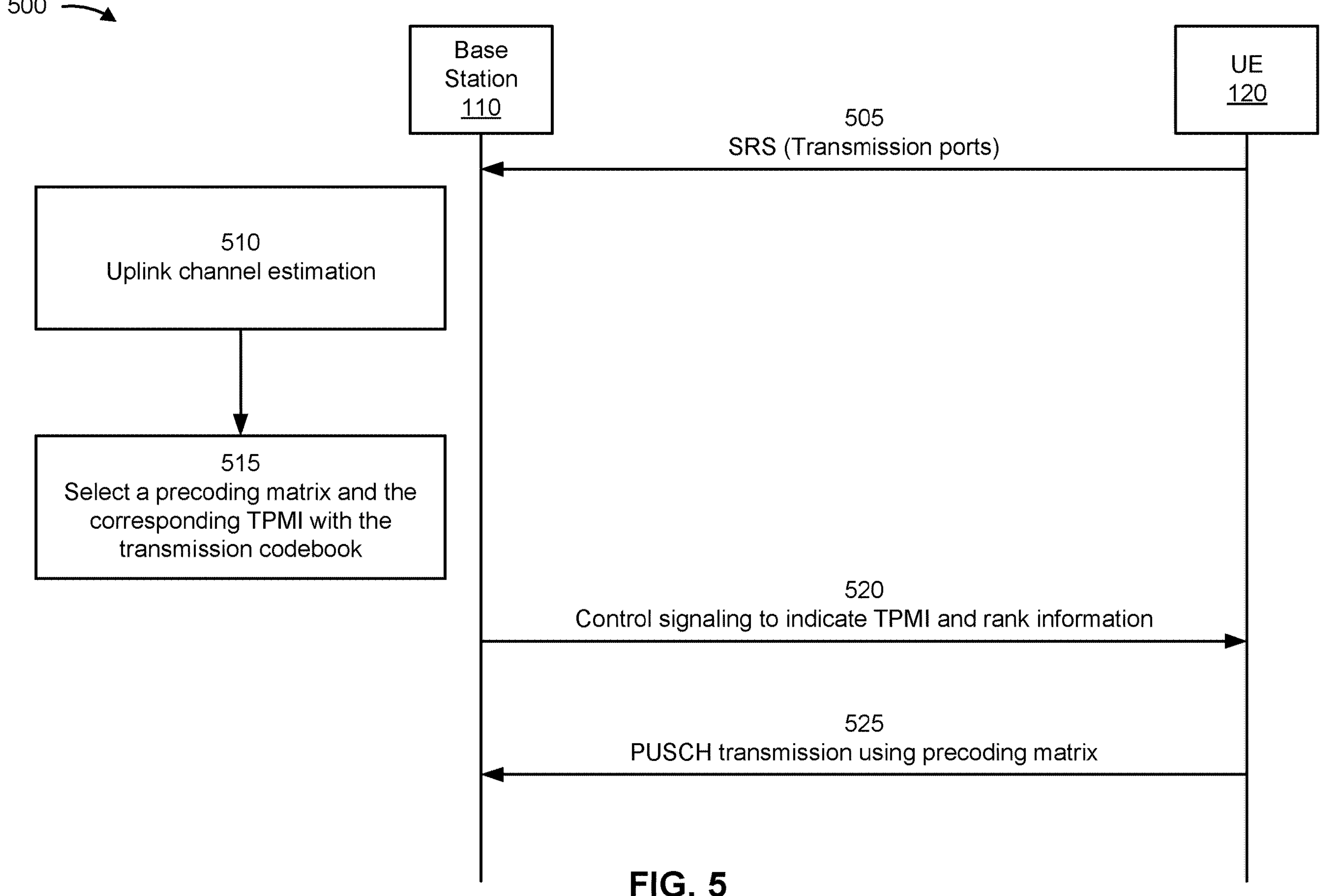
FIG. 5 is a diagram illustrating an example of codebook-based uplink transmission, in accordance with the present disclosure.

FIG. 5 is a diagram illustrating an example 500 of codebook-based uplink transmission, in accordance with the present disclosure.

As shown in FIG. 5, a UE 120 and a base station 110 (or, in some other aspects, another network entity, such as a CU 310, a DU 330, and RU 340, or the like) may communicate with one another via the wireless network 100. As described in connection with FIG. 4, the base station 110 may configure the UE 120 with one or more SRS resource sets to allocate resources for SRS transmissions by the UE 120. Accordingly, as shown by reference number 505, the UE 120 may transmit, to the base station 110, one or more SRSs from one or more transmission ports (e.g., antenna ports).

As shown at reference number 510, the base station 110 may perform uplink channel estimation based at least in part on the SRSs transmitted by the UE 120. For example, based at least in part on SRSs received via multiple transmission ports at the UE 120, the base station may estimate an uplink channel matrix, sometimes referred to as HUL. Based at least in part on the estimated uplink channel (e.g., HUL), and as indicated by reference number 515, the base station 110 may select a precoding matrix for the UE 120 to use when transmitting uplink communications, such as physical uplink shared channel (PUSCH) communications. Precoding is a technique that exploits transmit diversity by multiplying a data stream (layer) with beamforming weights for each antenna prior to transmission. Precoding may include mapping multiple individual layers to multiple antennas. A codebook may include multiple, preconfigured precoding matrices. Based at least in part on the uplink channel matrix (e.g., HUL) estimated from the SRSs transmitted by the UE 120, the base station 110 may select one of the multiple precoding matrices from the codebook to be used by the UE 120 during subsequent transmissions. In some aspects, the codebook from which the precoding matrix is selected may be referred to as a transmission codebook.

More particularly, the UE 120 may be equipped with multiple antennas, such as up to 4 antennas. Accordingly, a first physical antenna may transmit information via a first channel (sometimes referred to as h1), a second physical antenna may transmit information via a second channel (sometimes referred to as h2), a third physical antenna may transmit information via a third channel (sometimes referred to as h3), and a fourth physical antenna may transmit information via fourth channel (sometimes referred to as h4). Such information may be conveyed via a logical antenna port, which may represent some combination of the physical antennas and/or channels. In some cases, a UE 120 may not have information of the channels associated with the physical antennas, and the UE 120 may only operate based on information of the channels associated with antenna ports, as defined below.

An antenna port may be defined such that a channel, over which a symbol on the antenna port is conveyed, can be inferred from a channel over which another symbol on the same antenna port is conveyed. For example, a channel associated with antenna port 1 (AP1) may be represented as h1−h2+h3+j*h4, where channel coefficients (e.g., 1, −1, 1, and j ($\sqrt{-1}$), in this case) represent weighting factors (e.g., indicating phase and/or gain) applied to each channel. Such weighting factors may be applied to the channels to improve signal power and/or signal quality at one or more receivers. Applying such weighting factors to channel transmissions may be referred to as precoding, and a precoder may refer to a specific set of weighting factors applied to a set of channels.

Similarly, a channel associated with antenna port 2 (AP2) may be represented as h1+j*h3, and a channel associated with antenna port 3 (AP3) may represented as 2*h1−h2+(1+j)*h3+j*h4. In this case, antenna port 3 can be represented as the sum of antenna port 1 and antenna port 2 (e.g., AP3=AP1+AP2) because the sum of the expression representing antenna port 1 (h1-h2+h3+j*h4) and the expression representing antenna port 2 (h1+j*h3) equals the expression representing antenna port 3 (2*h1-h2+ (1+j)*h3+j*h4). It can also be said that antenna port 3 is related to antenna ports 1 and 2 [AP1, AP2] via the precoder [1,1] because 1 times the expression representing antenna port 1 plus 1 times the expression representing antenna port 2 equals the expression representing antenna port 3.

Accordingly, based at least in part on the knowledge of the various channels, as determined from the received SRS transmissions, the base station 110 may select a precoding matrix from the transmission codebook to be used for subsequent transmissions. In some cases, each precoding matrix in the transmission codebook may be associated with an indicator, sometimes referred to as a TPMI. Accordingly, the base station 110 may select a TPMI corresponding to the selected precoding matrix, and indicate the selected TPMI to the UE 120. More particularly, as shown by reference number 520, the base station 110 may use control signaling to indicate the TPMI to the UE 120. In some cases, the control signaling may also include rank information for the transmission codebook and/or associated with the TPMI. A rank of a codebook may correspond to a quantity of transmission layers to be transmitted by the UE 120. For example, a rank 1 codebook may be for one layer (e.g., one data stream), while a rank 4 codebook may be for four layers (e.g., four data streams). Aspects of fields used to indicate TPMI are described in more detail in connection with FIGS. 6A-6C.

As shown by reference number 525, the UE 120 may select the appropriate precoding matrix from the transmission codebook (e.g., by mapping the indicated TPMI and rank information to the corresponding precoding matrix), and thus transmit an uplink transmission (e.g., a PUSCH transmission) based at least in part on the precoding matrix (e.g., by weighting transmissions from each antenna port based at least in part on the coefficients indicated by the precoding matrix).

As indicated above, FIG. 5 is provided as an example. Other examples may differ from what is described with regard to FIG. 5.

FIGS. 6A-6C are diagrams illustrating an example 600 of an SRS resource set indicator field and TPMI fields associated with codebook-based uplink transmission, in accordance with the present disclosure.

In some aspects, an SRS resource set indicator field, one or more SRI fields, and/or one or more TPMI fields in a DCI communication may be used for purposes of indicating SRS resources and/or precoding matrices to be used for uplink transmissions. For example, in the case of multiple TRP (sometimes referred to as multi-TRP) PUSCH repetition, a UE 120 may be configured with multiple (e.g., two) SRS resource sets, with one or more (e.g., two) SRS resources configured per SRS resource set. In such cases, a UE 120 may be configured with a same number of SRS resources (e.g., one or two) in each SRS resource set (e.g., the UE 120 is not expected to be configured with a different number of SRS resources in the two SRS resource sets). Moreover, when two SRI fields are used in a DCI communication, a number of SRS ports (which may be indicated by a nrofSRS-Ports parameter) for the two indicated SRS resources may be the same.

As shown by reference number 605 in FIG. 6A, in aspects in which multiple (e.g., two) SRI fields are used and/or multiple TPMI fields (e.g., two) are used in a DCI communication for purposes of indicating SRS resources and/or precoding matrices to be used for uplink transmissions, the DCI communication may include an SRS resource set indicator. The SRS resource set indicator may indicate a mapping between the multiple SRI fields and/or TPMI fields and the SRS resource sets and/or SRS resources. More particularly, in some cases, an SRS resource set indicator mapped to index 0 may be used to indicate that the first SRI field and the first TPMI field are associated with the first SRS resource set, and that the second SRI field and the second TPMI field are reserved (e.g., not used in this case). Moreover, an SRS resource set indicator mapped to index 1 may be used to indicate that the first SRI field and the first TPMI field are associated with the second SRS resource set, and that the second SRI field and the second TPMI field are reserved (e.g., not used in this case). Moreover, an SRS resource set indicator mapped to index 2 may be used to indicate that the first SRI field and the first TPMI field are associated with the first SRS resource set, and that that the second SRI field and the second TPMI field are associated with the second SRS resource set. Similarly, an SRS resource set indicator mapped to index 3 may be used to indicate that the first SRI field and the first TPMI field are associated with the first SRS resource set, and that that the second SRI field and the second TPMI field are associated with the second SRS resource set.

In some cases, two SRI fields, two TPMI fields, and/or the SRS resource set indicator field may be used to support four uplink transmission chains (sometimes referred to 4Tx MIMO or simply 4Tx) by the UE 120. For example, the tables shown in FIGS. 6B and 6C, indicated by reference numbers 610 and 615, respectively, show information conveyed by the two TPMI fields for 4Tx MIMO. In such cases, the UE 120 may be configured with a codebook subset restriction (sometimes referred to as codebookSubset), which may be one of a non-coherent (NC) codebook subset, a partially coherent (PC)/NC codebook subset, or a fully coherent (FC)/PC/NC codebook subset. The two TPMI fields may indicate which precoding matrix with the configured codebook subset should be used for an uplink transmission.

More particularly, the first TPMI field may indicate a number of layers and the selected precoding matrix to be used for transmission, and a second TPMI field may indicate the selected precoding matrix associated with the number of layers indicated by the first TPMI field and codebook subset. For example, if the UE 120 is configured with the NC codebook subset, and the first TPMI field indicates index 9, the UE 120 would select the precoding matrix indexed as TPMI 5, associated with two layer transmission (e.g., rank 2), as shown in FIG. 6B. If the second TPMI field indicates index 5, the UE 120 would select the precoding matrix indexed as TPMI 5, associated with rank 2 which is indicated by the first TPMI field, as shown in FIG. 6C. As another example, if the UE 120 is configured with the FC/PC/NC codebook subset and the first TPMI field indicates index 56, the UE 120 would select the precoding matrix indexed as TPMI 3, associated with three layer transmission (e.g., rank 3), as shown in FIG. 6B. If the second TPMI field indicates bit index 3, the UE 120 would select the precoding matrix indexed as TPMI 3, associated with rank 3, as shown in FIG. 6C. Precoding matrices associated with the various codebook subsets (e.g., the NC codebook subset, the PC/NC codebook subset, and the FC/PC/NC codebook subset) and ranks (e.g., ranks 1-4) for 4Tx MIMO are described in more detail in connection with FIGS. 7A-7D, below.

As indicated above, FIGS. 6A-6C are provided examples. Other examples may differ from what is described with regard to FIGS. 6A-6C.

FIGS. 7A-7D are diagrams illustrating an example 700 of 4Tx MIMO codebooks associated with codebook-based uplink transmission, in accordance with the present disclosure.

Reference number 705 indicates the uplink 4Tx MIMO codebook associated with one transmission layer (e.g., the rank 1 codebook). The 4Tx MIMO codebook shown by reference number 705 includes various precoding matrices that may be selected by a base station 110 or a similar network entity for the UE 120 to transmit uplink transmissions. For the rank 1 codebook, the first four precoding matrices (e.g., the precoding matrices associated with TPMI 0-3) are associated with the NC codebook subset, the second eight precoding matrices (e.g., the precoding matrices associated with TPMI 4-11) are associated with the PC/NC codebook subset, and the final sixteen precoding matrices (e.g., the precoding matrices associated with TPMI 12-27) are associated with the FC/PC/NC codebook subset.

Put another way, an NC precoding matrix codebook subset for 4Tx, rank 1, may include precoding matrices of:

$$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \text{ and } \frac{1}{2}\begin{bmatrix}0\\0\\0\\1\end{bmatrix}.$$

A PC/NC precoding matrix codebook subset for 4Tx, rank 1, may include precoding matrices of:

$$\frac{1}{2}\begin{bmatrix}1\\0\\1\\0\end{bmatrix}, \frac{1}{2}\begin{bmatrix}0\\1\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \text{ and } \frac{1}{2}\begin{bmatrix}0\\1\\0\\-j\end{bmatrix}.$$

And an FC/PC/NC precoding matrix codebook subset for 4Tx, rank 1, may include precoding matrices of:

$$\frac{1}{2}\begin{bmatrix}1\\1\\1\\1\end{bmatrix}, \frac{1}{2}\begin{bmatrix}1\\1\\j\\j\end{bmatrix}, \frac{1}{2}\begin{bmatrix}1\\1\\-1\\-1\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\j\\-1\end{bmatrix}, \frac{1}{2}\begin{bmatrix}1\\j\\-1\\-j\end{bmatrix}, \frac{1}{2}\begin{bmatrix}1\\j\\-j\\-1\end{bmatrix},$$

$$\frac{1}{2}\begin{bmatrix}1\\-1\\1\\-1\end{bmatrix}, \frac{1}{2}\begin{bmatrix}1\\-1\\j\\-j\end{bmatrix}, \frac{1}{2}\begin{bmatrix}1\\-1\\-1\\1\end{bmatrix}, \frac{1}{2}\begin{bmatrix}1\\-1\\-j\\j\end{bmatrix}, \frac{1}{2}\begin{bmatrix}1\\-j\\1\\-j\end{bmatrix}, \frac{1}{2}\begin{bmatrix}1\\-j\\j\\1\end{bmatrix}, \frac{1}{2}\begin{bmatrix}1\\-j\\-1\\j\end{bmatrix}, \frac{1}{2}\begin{bmatrix}1\\-j\\-j\\-1\end{bmatrix}.$$

Reference number 710 indicates the uplink 4Tx MIMO codebook associated with two transmission layers (e.g., the rank 2 codebook). For the rank 2 codebook, the first six precoding matrices (e.g., the precoding matrices associated with TPMI 0-5) are associated with the NC codebook subset, the second eight precoding matrices (e.g., the precoding matrices associated with TPMI 6-13) are associated with the PC/NC codebook subset, and the final eight precoding matrices (e.g., the precoding matrices associated with TPMI 14-21) are associated with the FC/PC/NC codebook subset.

Put another way, an NC precoding matrix codebook subset for 4Tx, rank 2, may include precoding matrices of:

$$\frac{1}{2}\begin{bmatrix}1&0\\0&1\\0&0\\0&0\end{bmatrix}, \frac{1}{2}\begin{bmatrix}1&0\\0&0\\0&1\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\1&0\\0&0\\0&1\end{bmatrix}, \text{ and } \frac{1}{2}\begin{bmatrix}0&0\\0&0\\1&0\\0&1\end{bmatrix}.$$

A PC/NC precoding matrix codebook subset for 4Tx, rank 2, may include precoding matrices of:

$$\frac{1}{2}\begin{bmatrix}1&0\\0&1\\1&0\\0&-j\end{bmatrix}, \frac{1}{2}\begin{bmatrix}1&0\\0&1\\1&0\\0&j\end{bmatrix}, \frac{1}{2}\begin{bmatrix}1&0\\0&1\\-j&0\\0&1\end{bmatrix}, \frac{1}{2}\begin{bmatrix}1&0\\0&1\\-j&0\\0&-1\end{bmatrix},$$

$$\frac{1}{2}\begin{bmatrix}1&0\\0&1\\-1&0\\0&-j\end{bmatrix}, \frac{1}{2}\begin{bmatrix}1&0\\0&1\\-1&0\\0&j\end{bmatrix}, \frac{1}{2}\begin{bmatrix}1&0\\0&1\\j&0\\0&1\end{bmatrix}, \text{ and } \frac{1}{2}\begin{bmatrix}1&0\\0&1\\j&0\\0&-1\end{bmatrix}.$$

And an FC/PC/NC precoding matrix codebook subset for 4Tx, rank 2, may include precoding matrices of:

$$\frac{1}{2\sqrt{2}}\begin{bmatrix}1&1\\1&1\\1&-1\\1&-1\end{bmatrix}, \frac{1}{2\sqrt{2}}\begin{bmatrix}1&1\\1&1\\j&-j\\j&-j\end{bmatrix}, \frac{1}{2\sqrt{2}}\begin{bmatrix}1&1\\j&j\\1&-1\\j&-j\end{bmatrix}, \frac{1}{2\sqrt{2}}\begin{bmatrix}1&1\\j&j\\j&-j\\-1&1\end{bmatrix},$$

$$\frac{1}{2\sqrt{2}}\begin{bmatrix}1&1\\-1&-1\\1&-1\\-1&1\end{bmatrix}, \frac{1}{2\sqrt{2}}\begin{bmatrix}1&1\\-1&-1\\j&-j\\-j&j\end{bmatrix}, \frac{1}{2\sqrt{2}}\begin{bmatrix}1&1\\-j&-j\\1&-1\\-j&j\end{bmatrix}, \text{ and } \frac{1}{2\sqrt{2}}\begin{bmatrix}1&1\\-j&-j\\j&-j\\1&-1\end{bmatrix}.$$

Reference number 715 indicates the uplink 4Tx MIMO codebook associated with three transmission layers (e.g., the rank 3 codebook). For the rank 3 codebook, the first precoding matrix (e.g., the precoding matrix associated with TPMI 0) is associated with the NC codebook subset, the second two precoding matrices (e.g., the precoding matrices associated with TPMI 1-2) are associated with the PC/NC codebook subset, and the final four precoding matrices (e.g., the precoding matrices associated with TPMI 3-6) are associated with the FC/PC/NC codebook subset.

Put another way, an NC precoding matrix codebook subset for 4Tx, rank 3, may include the precoding matrix:

$$\frac{1}{2}\begin{bmatrix} 1 & 0 & 0 \\ 0 & 1 & 0 \\ 0 & 0 & 1 \\ 0 & 0 & 0 \end{bmatrix}.$$

A PC/NC precoding matrix codebook subset for 4Tx, rank 3, may include precoding matrices of:

$$\frac{1}{2}\begin{bmatrix} 1 & 0 & 0 \\ 0 & 1 & 0 \\ 1 & 0 & 0 \\ 0 & 0 & 1 \end{bmatrix}, \text{ and } \frac{1}{2}\begin{bmatrix} 1 & 0 & 0 \\ 0 & 1 & 0 \\ -1 & 0 & 0 \\ 0 & 0 & 1 \end{bmatrix}.$$

And an FC/PC/NC precoding matrix codebook subset for 4Tx, rank 3, may include precoding matrices of:

$$\frac{1}{2\sqrt{3}}\begin{bmatrix} 1 & 1 & 1 \\ 1 & -1 & 1 \\ 1 & 1 & -1 \\ 1 & -1 & -1 \end{bmatrix}, \frac{1}{2\sqrt{3}}\begin{bmatrix} 1 & 1 & 1 \\ 1 & -1 & 1 \\ j & j & -j \\ j & -j & -j \end{bmatrix},$$

$$\frac{1}{2\sqrt{3}}\begin{bmatrix} 1 & 1 & 1 \\ -1 & 1 & -1 \\ 1 & 1 & -1 \\ -1 & 1 & 1 \end{bmatrix}, \text{ and } \frac{1}{2\sqrt{3}}\begin{bmatrix} 1 & 1 & 1 \\ -1 & 1 & -1 \\ j & j & -j \\ -j & j & j \end{bmatrix}.$$

Reference number 720 indicates the uplink 4Tx MIMO codebook associated with four transmission layers (e.g., the rank 4 codebook). For the rank 4 codebook, the first precoding matrix (e.g., the precoding matrix associated with TPMI 0) is associated with the NC codebook subset, the second two precoding matrices (e.g., the precoding matrices associated with TPMI 1-2) are associated with the PC/NC codebook subset, and the final two precoding matrices (e.g., the precoding matrices associated with TPMI 3-4) are associated with the FC/PC/NC codebook subset.

Put another way, an NC precoding matrix codebook subset for 4Tx, rank 4, may include the precoding matrix:

$$\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}.$$

A PC/NC precoding matrix codebook subset for 4Tx, rank 4, may include precoding matrices of:

$$\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}, \text{ and } \frac{1}{2\sqrt{2}}\begin{bmatrix} 1 & 1 & 0 & 0 \\ 0 & 0 & 1 & 1 \\ j & -j & 0 & 0 \\ 0 & 0 & -j & -j \end{bmatrix}.$$

And an FC/PC/NC precoding matrix codebook subset for 4Tx, rank 4, may include precoding matrices of:

$$\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}, \text{ and } \frac{1}{4}\begin{bmatrix} 1 & 1 & 1 & 1 \\ 1 & -1 & 1 & -1 \\ j & j & -j & -j \\ j & -j & -j & j \end{bmatrix}.$$

In some cases, it may be beneficial to configure a UE 120 to operate in a full-power mode when transmitting uplink transmissions. For example, a UE 120 may be configured to operate in a full-power mode (e.g., transmit uplink transmissions using full-power amplification capabilities) in order to improve cell edge coverage or the like. However, when a UE 120 is configured with more than one SRS port in MIMO mode, full power (with respect to the UE 120's power class) may not be able to be delivered using NC and/or PC/NC precoders (such as the precoding matrixes associated with the NC or PC/FC codebook subsets described above in connection with FIGS. 7A-7D). This is because the precoding matrices for the NC codebook subset and/or PC/NC codebook subset may be associated with a transmission power scaling factor, which may be equal to a number of non-zero ports divided by a maximum number of configured SRS ports. For example, in a two transmission chain (2Tx) MIMO system, a UE 120 configured with the precoder $$\begin{bmatrix} 1 \\ 0 \end{bmatrix}$$

would result in a power scaling factor of ½. More broadly, a matrix that includes at least one row without a value of 1, −1, j, or −j, will result in a non-full-power transmission by the UE 120, because at least one power amplifier associated with an antenna port will not be utilized to transmit a signal.

Accordingly, in some cases, a UE 120 may be configured to operate in one of three full-power modes (e.g., mode 0, mode 1, or mode 2) to allow for an NC or a PC UE 120 to deliver full power with a PUSCH transmission. Mode 0 may correspond to a mode in which the UE 120 has a full rated power amplification (with respect to the UE 120's power class) on each transmission chain. Put another way, if mode 0 full power mode is configured, the UE 120 may not apply a scaling factor (such as ½ in the above described example in connection with the precoder $$\begin{bmatrix} 1 \\ 0 \end{bmatrix}),$$

but the instead the UE 120 may remove the scaling factor and thus increase the transmission power of one or more power amplifiers in order to achieve a full-power transmission. For mode 1 and mode 2, the UE 120 may not have full rated power amplification (with respect to the UE 120's power class) on each transmission chain. Instead, the UE 120 may be configured with additional information in order to achieve a full-power transmission. For example, in mode 1, the UE 120 may be configured with a new precoder (e.g., a precoding matrix not associated with the NC codebook subset or the PC/NC codebook subset shown in FIGS. 7A-7D) in order to achieve a full power transmission.

In some cases, a UE 120 may report its capability regarding which modes (e.g., mode 0, mode 1, and/or mode 2) the UE 120 supports, and a network entity may configure the UE 120 to operate in one mode via RRC signaling or the like. In some cases, the network entity may configure the UE 120 to use a full-power mode using a full-power uplink transmission parameter (sometimes referred to as ULFPTx), and may further configure the UE 120 to use a particular mode (e.g., mode 0, mode 1, or mode 2) using a full-power uplink transmission mode parameter (sometimes referred to as ULFPTxModes). In cases in which the UE 120 is enabled with full-power uplink transmission but a mode is not indicated (e.g., the UE 120 is not configured with the ULFPTxModes parameter), the UE 120 may operate in mode 0 (e.g., mode 0 may serve as the default mode). When the network entity configures the UE 120 to use mode 0 (or else when no mode is indicated), the UE 120 may remove a power scaling factor when transmitting an uplink communication (or, equivalently, may set the power scaling factor to 1).

In cases in which an NC or PC UE 120 is configured to operate in mode 1, the UE 120 may need to implement a precoding matrix selected from an additional set of precoders in order to achieve the full-power transmission. For example, for 2Tx MIMO, one additional precoding matrix (e.g., $$\frac{1}{\sqrt{2}}\begin{bmatrix}1\\1\end{bmatrix},$$

which is the matrix indexed as TPMI 2 in the 2Tx, rank 1 codebook) may be supported in mode 1 to allow the NC or PC UE 120 to perform a full-power transmission. For a 4Tx UE 120, three additional precoding matrices may be supported in mode 1 for an NC UE 120 (e.g., three precoding matrices from the FC/PC/NC codebook or the PC/NC may be used by an NC UE 120 to achieve a full-power transmission), while four additional precoding matrices may be supported in mode 1 for a PC UE 120 (e.g., four precoding matrices from the FC/PC/NC codebook may be used by a PC UE 120 to achieve full-a power transmission). More particularly, for a 4Tx NC UE 120 in mode 1, the three additional precoding matrices supported may be the matrices indexed as TPMI 13 in the rank 1 FC/PC/NC codebook subset (e.g., $$\frac{1}{2}\begin{bmatrix}1\\1\\j\\j\end{bmatrix},$$

as shown in FIG. 7A), TPMI 6 in the rank 2 PC/NC codebook subset (e.g., $$\frac{1}{2}\begin{bmatrix}1&0\\0&1\\1&0\\0&-j\end{bmatrix},$$

as shown in FIG. 7B), and TPMI 1 in the rank 3 PC/NC codebook subset (e.g., $$\frac{1}{2}\begin{bmatrix}1&0&0\\0&1&0\\1&0&0\\0&0&1\end{bmatrix},$$

as shown in FIG. 7C). For a 4Tx PC UE 120 in mode 1, the four additional precoding matrices supported may be the matrices indexed as TPMI 12 in the rank 1 FC/PC/NC codebook subset (e.g., $$\frac{1}{2}\begin{bmatrix}1\\1\\1\\1\end{bmatrix},$$

as shown in FIG. 7A), TPMI 13 in the rank 1 FC/PC/NC codebook subset (e.g., $$\frac{1}{2}\begin{bmatrix}1\\1\\j\\j\end{bmatrix},$$

as shown in FIG. 7A), TPMI 14 in the rank 1 FC/PC/NC codebook subset (e.g., $$\frac{1}{2}\begin{bmatrix}1\\1\\-1\\-1\end{bmatrix},$$

as shown in FIG. 7A), and TPMI 15 in the rank 1 FC/PC/NC codebook subset (e.g., $$\frac{1}{2}\begin{bmatrix}1\\1\\-j\\-j\end{bmatrix},$$

as shown in FIG. 7A).

In some cases, a UE 120 may be capable of uplink transmissions using more than four transmission chains. For example, a UE 120 may be capable of uplink transmissions using eight uplink transmission chains, sometimes referred to as 8Tx MIMO, or simply 8Tx. In such cases, an NC or a PC UE 120 (sometimes referred to herein as a non-full-rank UE 120) may not be capable of performing a full-power transmission using eight uplink transmission chains, because the precoding matrices described above or other precoding matrices may not support full-power 8Tx. This may lead to poor coverage and low-quality communications, particularly for a UE 120 operating at a cell edge or the like where a full power mode (e.g., a 4Tx full-power mode) may have otherwise traditionally been used in an effort to increase coverage. This may cause the UE 120 and/or one or more network entities to consume computing, power, network, and/or communication resources to detect and/or correct communication errors, resulting in increased latency and decreased throughput, inefficient usage of network resources, and overall unreliable communications.

Some techniques and apparatuses described herein enable an 8Tx full-power mode, such as 8Tx full-power mode 1 transmissions. In some aspects, a UE (e.g., UE 120) may receive, from a network entity (e.g., a base station 110, a CU 310, a DU 330, an RU 340, or a similar network entity) a configuration of a power mode for transmitting eight uplink transmission chains. In some aspects, the power mode may be either a full-power mode (e.g., an 8Tx MIMO full-power mode 1, or a similar full-power mode) or a non-full-power mode. When configured with the non-full-power mode, the UE may transmit the eight uplink transmission chains based at least in part on a default codebook, which may include a first set of precoding matrices. And when configured with the full-power mode, the UE may transmit the eight uplink transmission chains based at least in part on a full-power codebook, which may include a second set of precoding matrices. The second set of precoding matrices may be configured such that, when the UE transmits the eight uplink transmissions using a precoding matrix associated with the second set of precoding matrices, the UE is capable of achieving an 8Tx full-power uplink transmission. In some aspects, the network entity may indicate to the UE a TPMI for transmitting the eight uplink transmissions, which may be based at least in part on the configuration of the power mode (e.g., the TPMI may indicate a precoding matrix from one of the first set of precoding matrices or the second set of precoding matrices based at least in part on the configuration of the power mode). In this regard, the UE may be able to achieve 8Tx full-power transmission, enabling the UE and/or the network entity to conserve computing, power, network, and/or communication resources that may have otherwise been consumed 8Tx non-full-power transmissions. For example, based at least in part on UE performing 8Tx full-power transmissions, the UE and the network entity may communicate with a reduced error rate, which may conserve computing, power, network, and/or communication resources that may have otherwise been consumed to detect and/or correct communication errors. As a result, the UE and/or the network entity may experience reduced latency and increased throughput, and overall efficient usage of network resources and more reliable communications.

As indicated above, FIGS. 7A-7D are provided examples. Other examples may differ from what is described with regard to FIGS. 7A-7D.

FIG. 8 is a diagram illustrating an example 800 of a default 8Tx MIMO codebook associated with codebook-based uplink transmission, in accordance with the present disclosure.

The codebook shown in FIG. 8 may be referred to as a "default" codebook because the codebook may be the one utilized by a UE 120 when no power mode is specified, when a non-full-power mode is configured, and/or when a full-power mode that does not require additional precoding matrices (e.g., mode 0) is configured. Put another way, the default codebook may be utilized by the UE 120 absent reception a full-power mode 1 configuration, or the like. The default codebook may include multiple precoding matrices used by the UE 120 for 8Tx MIMO. In some aspects, the default codebook for 8Tx MIMO may be based at least in part on a 4Tx MIMO codebook, such as one or more of the codebooks described in connection with FIGS. 7A-7D. For example, and as shown in FIG. 8, the default codebook may incorporate precoding matrices referred to as $W_{4Tx,r=R}$, which are 4Tx rank R precoding matrices. That is, the rank 1 codebook for 8Tx MIMO may incorporate 4Tx rank 1 precoding matrices (e.g., $W_{4Tx,r=1}$), the rank 2 codebook for 8Tx MIMO may incorporate 4Tx rank 1 or rank 2 precoding matrices (e.g., $W_{4Tx,r=1}$ or $W_{4Tx,r=2}$), the rank 3 codebook for 8Tx MIMO may incorporate 4Tx rank 1, rank 2, or rank 3 precoding matrices (e.g., $W_{4Tx,r=1}$, $W_{4Tx,r=2}$, or $W_{4Tx,r=3}$), and the rank 4-8 codebooks for 8Tx MIMO may incorporate 4Tx rank 1, rank 2, rank 3, or rank 4 precoding matrices (e.g., $W_{4Tx,r=1}$, $W_{4Tx,r=2}$, $W_{4Tx,r=3}$, or $W_{4Tx,r=4}$).

Moreover, each codebook may be associated with multiple types of codebooks. For example, in some aspects the default 8Tx rank 1 codebook may include a Type 1 codebook, including a set of matrices corresponding to $$\frac{1}{\sqrt{2}}\begin{bmatrix} W_{4Tx,r=1} \\ 0 \end{bmatrix},$$

and/or a Type 2 codebook, including a set of matrices corresponding to $$\frac{1}{\sqrt{2}}\begin{bmatrix} 0 \\ W_{4Tx,r=1} \end{bmatrix}.$$

In some aspects, the default 8Tx rank 2 codebook may include a Type 1 codebook, including a set of matrices corresponding to $$\frac{1}{\sqrt{2}}\begin{bmatrix} W_{4Tx,r=2} \\ 0 \end{bmatrix},$$

a Type 2 codebook, including a set of matrices corresponding to $$\frac{1}{\sqrt{2}}\begin{bmatrix} 0 \\ W_{4Tx,r=2} \end{bmatrix},$$

and/or a Type 3 codebook, including a set of matrices corresponding to $$\frac{1}{\sqrt{2}}\begin{bmatrix} W_{4Tx,r=1} & 0 \\ 0 & W'_{4Tx,r=1} \end{bmatrix},$$

where $W_{4Tx,r=1}$ may be the same matrix as $W'_{4Tx,r=1}$ or may be a different matrix than $W'_{4Tx,r=1}$.

In some aspects, the default 8Tx rank 3 codebook may include a Type 1 codebook, including a set of matrices corresponding to $$\frac{1}{\sqrt{2}}\begin{bmatrix} W_{4Tx,r=3} \\ 0 \end{bmatrix},$$

a Type 2 codebook, including a set of matrices corresponding to $$\frac{1}{\sqrt{2}}\begin{bmatrix} 0 \\ W_{4Tx,r=3} \end{bmatrix},$$

a Type 3 codebook, including a set of matrices corresponding to $$\frac{1}{\sqrt{2}}\begin{bmatrix} W_{4Tx,r=2} & 0 \\ 0 & W_{4Tx,r=1} \end{bmatrix},$$

and/or a Type 4 codebook, including a set of matrices corresponding to $$\frac{1}{\sqrt{2}}\begin{bmatrix} W_{4Tx,r=1} & 0 \\ 0 & W_{4Tx,r=2} \end{bmatrix}.$$

In some aspects, the default 8Tx rank 4 codebook may include a Type 1 codebook, including a set of matrices corresponding to $$\frac{1}{\sqrt{2}}\begin{bmatrix} W_{4Tx,r=4} \\ 0 \end{bmatrix},$$

a Type 2 codebook, including a set of matrices corresponding to $$\frac{1}{\sqrt{2}}\begin{bmatrix} 0 \\ W_{4Tx,r=4} \end{bmatrix},$$

a Type 3 codebook, including a set of matrices corresponding to $$\frac{1}{\sqrt{2}}\begin{bmatrix} W_{4Tx,r=2} & 0 \\ 0 & W'_{4Tx,r=4} \end{bmatrix}$$

(where $W_{4Tx,r=2}$ may be the same matrix as $W'_{4Tx,r=2}$ or may be a different matrix than $W'_{4Tx,r=2}$), a Type 4 codebook, including a set of matrices corresponding to $$\frac{1}{\sqrt{2}}\begin{bmatrix} W_{4Tx,r=3} & 0 \\ 0 & W_{4Tx,r=1} \end{bmatrix},$$

and/or a Type codebook, including a set of matrices corresponding to $$\frac{1}{\sqrt{2}}\begin{bmatrix} W_{4Tx,r=1} & 0 \\ 0 & W_{4Tx,r=3} \end{bmatrix}.$$

In some aspects, the default 8Tx rank 5 codebook may include a Type 1 codebook, including a set of matrices corresponding to $$\frac{1}{\sqrt{2}}\begin{bmatrix} W_{4Tx,r=3} & 0 \\ 0 & W_{4Tx,r=2} \end{bmatrix},$$

a Type 2 codebook, including a set of matrices corresponding to $$\frac{1}{\sqrt{2}}\begin{bmatrix} W_{4Tx,r=2} & 0 \\ 0 & W_{4Tx,r=3} \end{bmatrix},$$

a Type 3 codebook, including a set of matrices corresponding to $$\frac{1}{\sqrt{2}}\begin{bmatrix} W_{4Tx,r=4} & 0 \\ 0 & W_{4Tx,r=1} \end{bmatrix},$$

and/or a Type 4 codebook, including a set of matrices corresponding to $$\frac{1}{\sqrt{2}}\begin{bmatrix} W_{4Tx,r=1} & 0 \\ 0 & W_{4Tx,r=4} \end{bmatrix}.$$

In some aspects, the default 8Tx rank 6 codebook may include a Type 1 codebook, including a set of matrices corresponding to $$\frac{1}{\sqrt{2}}\begin{bmatrix} W_{4Tx,r=3} & 0 \\ 0 & W_{4Tx,r=3} \end{bmatrix},$$

a Type 2 codebook, including a set of matrices corresponding to $$\frac{1}{\sqrt{2}}\begin{bmatrix} W_{4Tx,r=4} & 0 \\ 0 & W_{4Tx,r=2} \end{bmatrix},$$

and/or a Type 3 codebook, including a set of matrices corresponding to $$\frac{1}{\sqrt{2}}\begin{bmatrix} W_{4Tx,r=2} & 0 \\ 0 & W_{4Tx,r=4} \end{bmatrix}.$$

In some aspects, the default 8Tx rank 7 codebook may include a Type 1 codebook, including a set of matrices corresponding to $$\frac{1}{\sqrt{2}}\begin{bmatrix} W_{4Tx,r=4} & 0 \\ 0 & W_{4Tx,r=3} \end{bmatrix},$$

and/or a Type 2 codebook, including a set of matrices corresponding to $$\frac{1}{\sqrt{2}}\begin{bmatrix} W_{4Tx,r=3} & 0 \\ 0 & W_{4Tx,r=4} \end{bmatrix}.$$

And, in some aspects, the default 8Tx rank 8 codebook may include a Type 1 codebook, including a set of matrices corresponding to $$\frac{1}{\sqrt{2}}\begin{bmatrix} W_{4Tx,r=4} & 0 \\ 0 & W'_{4Tx,r=4} \end{bmatrix},$$

where $W_{4Tx,r=4}$ may be the same matrix as $W'_{4Tx,r=4}$ or may be a different matrix than $W'_{4Tx,r=4}$.

The default codebooks shown in FIG. 8 may include NC precoding matrices, partially coherent for 2 ports (PC-2) precoding matrices (sometimes referred to as PC-2/NC precoding matrices), and partially coherent for four ports (PC-4) precoding matrices (sometimes referred to as PC-4/PC-2/NC precoding matrices). NC precoding matrices may only include a single element (e.g., 1, −1, j, or −j) in a column of the precoding matrix, while PC-2 and PC-4 precoding matrices may include two and four elements in a column, respectively. For example, a rank 1, Type 1 precoding matrix (e.g., $$\frac{1}{\sqrt{2}}\begin{bmatrix} W_{4Tx,r=1} \\ 0 \end{bmatrix})$$

based on an NC precoding matrix, such as $$W_{4Tx,r=1} = \begin{bmatrix} 1 \\ 0 \\ 0 \\ 0 \end{bmatrix},$$

would be $$\begin{bmatrix} 1 \\ 0 \\ 0 \\ 0 \\ 0 \\ 0 \\ 0 \\ 0 \end{bmatrix},$$

and thus would be an 8Tx NC precoding matrix. A rank 1, Type 1 precoding matrix (e.g., $$\frac{1}{\sqrt{2}}\begin{bmatrix} W_{4Tx,r=1} \\ 0 \end{bmatrix})$$

based on a PC precoding matrix, such as $$W_{4Tx,r=1} = \begin{bmatrix} 1 \\ 0 \\ 1 \\ 0 \end{bmatrix},$$

would be $$\begin{bmatrix} 1 \\ 0 \\ 1 \\ 0 \\ 0 \\ 0 \\ 0 \\ 0 \end{bmatrix},$$

and thus would be a PC-2 precoding matrix. And a rank 1, Type 1 precoding matrix (e.g., $$\frac{1}{\sqrt{2}}\begin{bmatrix} W_{4Tx,r=1} \\ 0 \end{bmatrix})$$

based on an FC precoding matrix, such as $$W_{4Tx,r=1} = \begin{bmatrix} 1 \\ 1 \\ 1 \\ 1 \end{bmatrix},$$

would be $$\begin{bmatrix} 1 \\ 1 \\ 1 \\ 1 \\ 0 \\ 0 \\ 0 \\ 0 \end{bmatrix},$$

and thus would be a PC-4 precoding matrix. More broadly, an 8Tx NC precoding matrix can be constructed by placing 4Tx NC matrices in the default 8Tx precoder structure, an 8Tx PC-2 precoding matrix can be constructed by placing 4Tx PC matrices in the default 8Tx precoder structure, and an 8Tx PC-4 precoding matrix can be constructed by placing 4Tx NC matrices in the default 8Tx precoder structure.

In order to support full power, each row of the resulting 8Tx precoding matrix must have at least one non-zero component. In that regard, certain of the default 8Tx precoding matrices shown in FIG. 8 cannot support full-power transmissions, because the resulting matrices will not include at least one non-zero component (e.g., 1, −1, j, or −j) in each row. For example, none of the resulting NC precoding matrices in the rank 1 through rank 7 codebooks support full-power transmissions (e.g., only one or more of the resulting NC precoding matrices in the rank 8 codebook support full-power transmissions), none of the resulting PC-2 precoding matrices in the rank 1 through rank 3 codebooks support full power transmissions (and thus one or more of the resulting PC-2 precoding matrices in each of the rank 4 through rank 8 codebooks support full-power transmissions), and none of the resulting PC-4 precoding matrices in the rank 1 codebook support full power transmission (and thus one or more of the resulting PC-4 precoding matrices in each of the rank 2 through rank 8 codebooks support full-power transmissions). Accordingly, for codebooks in which there is no full-power support (e.g., ranks 1-7 for NC precoding matrices, ranks 1-3 for PC-2 precoding matrices, and rank 1 for PC-4 precoding matrices) additional precoding matrices may be needed for 8Tx full-power mode 1 transmissions, or the like. Aspects of these additional precoding matrices are described in more detail in connection with FIGS. 9A-11, below.

As indicated above, FIG. 8 is provided as an example. Other examples may differ from what is described with regard to FIG. 8.

FIGS. 9A-9B are diagrams illustrating an example 900 of 8Tx MIMO full-power precoding matrices associated with codebook-based uplink transmission, in accordance with the present disclosure.

FIGS. 9A and 9B show additional precoding matrices that may be used to provide full-power transmissions when a UE 120 is configured to use an NC 8Tx MIMO codebook subset (e.g., the additional precoding matrices shown in FIGS. 9A and 9B correspond to NC full-power mode 1). In some aspects, the UE 120 may be configured to use the NC 8Tx MIMO codebook subset by a codebook subset parameter, sometimes referred to codebookSubset. Put another way, in some aspects, the UE 120 may be configured to use the additional precoding matrices shown in FIGS. 9A and 9B when the UE 120 is configured to use full-power mode (e.g., ULFPTx is enabled and ULFPTxModes=mode 1) and the UE 120 is configured to use the NC codebook subset (e.g., codebookSubset=NC).

In such aspects, the UE 120 may be configured with at least one additional precoding matrix for each of ranks 1 through rank 7, because, as described in connection with FIG. 8, for the NC codebook subset there is no full-power support for these codebooks. For example, and as shown in FIG. 9A, for rank 1, the UE 120 may be configured with an additional precoding matrix of $$\frac{1}{\sqrt{2}}\begin{bmatrix} W_{4Tx,r=1} \\ W'_{4Tx,r=1} \end{bmatrix},$$

where, in this example, $W_{4Tx,r=1}$ may be the same as $W'_{4Tx,r=1}$ (e.g., $W_{4Tx,r=1}=W'_{4Tx,r=1}$) and may be equal to the 4Tx, rank 1 precoding matrix indexed as TPMI 13 in FIG. 7A (e.g., $$\frac{1}{2}\begin{bmatrix} 1 \\ 1 \\ j \\ j \end{bmatrix}).$$

For rank 2, the UE 120 may be configured with an additional precoding matrix of $$\frac{1}{\sqrt{2}}\begin{bmatrix} W_{4Tx,r=1} & 0 \\ 0 & W'_{4Tx,r=1} \end{bmatrix},$$

where, in this example, $W_{4Tx,r=1}$ may be the same as $W'_{4Tx,r=1}$ (e.g., $W_{4Tx,r=1}=W'_{4Tx,r=1}$) and may be equal to the 4Tx, rank 1 precoding matrix indexed as TPMI 13 in FIG. 7A (e.g., $$\frac{1}{2}\begin{bmatrix} 1 \\ 1 \\ j \\ j \end{bmatrix}).$$

For rank 3, the UE 120 may be configured with an additional precoding matrix of $$\frac{1}{\sqrt{2}}\begin{bmatrix} W_{4Tx,r=2} & 0 \\ 0 & W_{4Tx,r=1} \end{bmatrix}, \text{ and/or } \frac{1}{\sqrt{2}}\begin{bmatrix} W_{4Tx,r=1} & 0 \\ 0 & W_{4Tx,r=2} \end{bmatrix},$$

where, in this example, $W_{4Tx,r=1}$ may be equal to the 4Tx, rank 1 precoding matrix indexed as TPMI 13 in FIG. 7A (e.g., $$\frac{1}{2}\begin{bmatrix} 1 \\ 1 \\ j \\ j \end{bmatrix})$$

and $W_{4Tx,r=2}$ may be equal to the 4Tx, rank 2 precoding matrix indexed as TPMI 6 in FIG. 7B (e.g., $$\frac{1}{2}\begin{bmatrix} 1 & 0 \\ 0 & 1 \\ 1 & 0 \\ 0 & -j \end{bmatrix}).$$

And for rank 4, the UE 120 may be configured with an additional precoding matrix of $$\frac{1}{\sqrt{2}}\begin{bmatrix} W_{4Tx,r=2} & 0 \\ 0 & W'_{4Tx,r=2} \end{bmatrix},$$

where, in this example, $W_{4Tx,r=2}$ may be the same as $W'_{4Tx,r=2}$ (e.g., $W_{4Tx,r=2}=W'_{4Tx,r=2}$) and may be equal to the 4Tx, rank 2 precoding matrix indexed as TPMI 6 in FIG. 7B (e.g., $$\frac{1}{2}\begin{bmatrix} 1 & 0 \\ 0 & 1 \\ 1 & 0 \\ 0 & -j \end{bmatrix}).$$

Moreover, and as shown in FIG. 9B, for rank 5, the UE 120 may be configured with an additional precoding matrix of $$\frac{1}{\sqrt{2}}\begin{bmatrix} W_{4Tx,r=3} & 0 \\ 0 & W_{4Tx,r=2} \end{bmatrix} \text{ and/or } \frac{1}{\sqrt{2}}\begin{bmatrix} W_{4Tx,r=3} & 0 \\ 0 & W_{4Tx,r=3} \end{bmatrix},$$

where, in this example, $W_{4Tx,r=2}$ may be equal to the 4Tx, rank 2 precoding matrix indexed as TPMI 6 in FIG. 7B (e.g., $$\frac{1}{2}\begin{bmatrix} 1 & 0 \\ 0 & 1 \\ 1 & 0 \\ 0 & -j \end{bmatrix}),$$

and $W_{4Tx,r=3}$ may be equal to the 4Tx, rank 3 precoding matrix indexed as TPMI 1 in FIG. 7C (e.g., $$\frac{1}{2}\begin{bmatrix} 1 & 0 & 0 \\ 0 & 1 & 0 \\ 1 & 0 & 0 \\ 0 & 0 & 1 \end{bmatrix}).$$

For rank 6, the UE 120 may be configured with an additional precoding matrix of $$\frac{1}{\sqrt{2}}\begin{bmatrix} W_{4Tx,r=3} & 0 \\ 0 & W'_{4Tx,r=3} \end{bmatrix},$$

where, in this example, $W_{4Tx,r=3}$ may be the same as matrix of $W'_{4Tx,r=3}$ (e.g., $W_{4Tx,r=3}=W'_{4Tx,r=3}$) and may be equal to the 4Tx, rank 3 precoding matrix indexed as TPMI in FIG. 7C (e.g., $$\frac{1}{2}\begin{bmatrix}1&0&0\\0&1&0\\1&0&0\\0&0&1\end{bmatrix}).$$

And for rank 7, the UE 120 may be configured with an additional precoding matrix of $$\frac{1}{\sqrt{2}}\begin{bmatrix}W_{4Tx,r=4}&0\\0&W_{4Tx,r=3}\end{bmatrix}\text{ and/or }\frac{1}{\sqrt{2}}\begin{bmatrix}W_{4Tx,r=3}&0\\0&W_{4Tx,r=4}\end{bmatrix},$$

where, in this example, $W_{4Tx,r=3}$ may be equal to the 4Tx, rank 3 precoding matrix indexed as TPMI 1 in FIG. 7C (e.g., $$\frac{1}{2}\begin{bmatrix}1&0&0\\0&1&0\\1&0&0\\0&0&1\end{bmatrix}),$$

and $W_{4Tx,r=4}$ may be equal to the 4Tx, rank 4 precoding matrix indexed as TPMI 0 in FIG. 7D (e.g., $$\frac{1}{2}\begin{bmatrix}1&0&0&0\\0&1&0&0\\0&0&1&0\\0&0&0&1\end{bmatrix}).$$

As a result, each additional precoding matrix shown in FIGS. 9A through 9B may include at least one non-zero element (e.g., 1, −1, j, or −j) in each row, and thus be used by an NC UE 120 to perform full-power transmissions.

As indicated above, FIGS. 9A-9B are provided examples. Other examples may differ from what is described with regard to FIGS. 9A-9B.

FIG. 10 is a diagram illustrating an example 1000 of 8Tx MIMO full-power precoding matrices associated with codebook-based uplink transmission, in accordance with the present disclosure.

FIG. 10 shows additional precoding matrices that may be used to provide full-power transmissions when a UE 120 is configured to use a PC-2/NC 8Tx MIMO codebook subset (e.g., the additional precoding matrices shown in FIGS. 9A and 9B correspond to PC-2 full-power mode 1). In some aspects, the PC-2/NC 8Tx MIMO codebook subset may alternatively be referred to as a PC-2 and NC 8Tx MIMO codebook subset, or simply a PC-2 8Tx MIMO codebook subset. In some aspects, the UE 120 may be configured to use the PC-2/NC 8Tx MIMO codebook subset by a codebook subset parameter (e.g., codebookSubset). Put another way, in some aspects, the UE 120 may be configured to use the additional precoding matrices shown in FIG. 10 when the UE 120 is configured to use full-power mode (e.g., ULFPTx is enabled and ULFPTxModes=mode 1), and the UE 120 is configured to use the PC-2/NC codebook subset (e.g., codebookSubset=PC-2 and/or PC-2/NC).

In such aspects, instead of or in addition to the precoding matrices described in connection with FIGS. 9A-9B, the UE 120 may be configured with at least one additional precoding matrix for each of ranks 1 through rank 3 for the PC-2/NC codebook subset, because, as described in connection with FIG. 8, for the PC-2/NC codebook subset there is no full power support for these codebooks. For example, for rank 1, the UE 120 may be configured with an additional precoding matrix of $$\frac{1}{\sqrt{2}}\begin{bmatrix}W_{4Tx,r=1}\\W'_{4Tx,r=1}\end{bmatrix},$$

where, in this example, $W_{4Tx,r=1}$ and $W'_{4Tx,r=1}$ may be selected from the 4Tx, rank 1 precoding matrices indexed as TPMI 12-15 in FIG. 7A (e.g., $$\frac{1}{2}\begin{bmatrix}1\\1\\1\\1\end{bmatrix},\frac{1}{2}\begin{bmatrix}1\\1\\j\\j\end{bmatrix},\frac{1}{2}\begin{bmatrix}1\\1\\-1\\-1\end{bmatrix},\text{ or }\frac{1}{2}\begin{bmatrix}1\\1\\-j\\-j\end{bmatrix}).$$

For rank 2, the UE 120 may be configured with an additional precoding matrix of $$\frac{1}{\sqrt{2}}\begin{bmatrix}W_{4Tx,r=1}&0\\0&W'_{4Tx,r=1}\end{bmatrix},$$

where, in this example, $W_{4Tx,r=1}$ and $W'_{4Tx,r=1}$ may be selected from the 4Tx, rank 1 precoding matrices indexed as TPMI 12-15 in FIG. 7A (e.g., $$\frac{1}{2}\begin{bmatrix}1\\1\\1\\1\end{bmatrix},\frac{1}{2}\begin{bmatrix}1\\1\\j\\j\end{bmatrix},\frac{1}{2}\begin{bmatrix}1\\1\\-1\\-1\end{bmatrix},\text{ or }\frac{1}{2}\begin{bmatrix}1\\1\\-j\\-j\end{bmatrix}).$$

And for rank 3, the UE 120 may be configured with an additional precoding matrix of $$\frac{1}{\sqrt{2}}\begin{bmatrix}W_{4Tx,r=2}&0\\0&W_{4Tx,r=1}\end{bmatrix}\text{ and/or }\frac{1}{\sqrt{2}}\begin{bmatrix}W_{4Tx,r=1}&0\\0&W_{4Tx,r=2}\end{bmatrix},$$

where, in this example, $W_{4Tx,r=1}$ may be selected from the 4Tx, rank 1 precoding matrices indexed as TPMI 12-15 in FIG. 7A (e.g., $$\frac{1}{2}\begin{bmatrix}1\\1\\1\\1\end{bmatrix},\frac{1}{2}\begin{bmatrix}1\\1\\j\\j\end{bmatrix},\frac{1}{2}\begin{bmatrix}1\\1\\-1\\-1\end{bmatrix},\text{ or }\frac{1}{2}\begin{bmatrix}1\\1\\-j\\-j\end{bmatrix}).$$

and $W_{4Tx,r=2}$ may be selected from the 4Tx, rank 2 PC precoding codebook subset, which includes the precoding matrices indexed as TPMI 6-13 in FIG. 7B (e.g., $$\frac{1}{2}\begin{bmatrix}1&0\\0&1\\1&0\\0&-j\end{bmatrix},\frac{1}{2}\begin{bmatrix}1&0\\0&1\\1&0\\0&j\end{bmatrix},\frac{1}{2}\begin{bmatrix}1&0\\0&1\\-j&0\\0&1\end{bmatrix},\frac{1}{2}\begin{bmatrix}1&0\\0&1\\-j&0\\0&-1\end{bmatrix},$$

-continued $$\frac{1}{2}\begin{bmatrix}1&0\\0&1\\-1&0\\0&-j\end{bmatrix},\ \frac{1}{2}\begin{bmatrix}1&0\\0&1\\-1&0\\0&j\end{bmatrix},\ \frac{1}{2}\begin{bmatrix}1&0\\0&1\\j&0\\0&1\end{bmatrix},\text{ or }\frac{1}{2}\begin{bmatrix}1&0\\0&1\\j&0\\0&-1\end{bmatrix}\Bigg).$$

As a result, each additional precoding matrix shown in FIG. 10 may include at least one non-zero element (e.g., 1, −1, j, or −j) in each row, and thus be used by a PC-2/NC UE 120 to perform full-power transmissions.

As indicated above, FIG. 10 is provided as an example. Other examples may differ from what is described with regard to FIG. 10.

FIG. 11 is a diagram illustrating an example 1100 of 8Tx MIMO full-power precoding matrices associated with codebook-based uplink transmission, in accordance with the present disclosure.

FIG. 11 shows additional precoding matrices that may be used to provide full-power transmissions when a UE 120 is configured to use a PC-4/PC-2/NC 8Tx MIMO codebook subset (e.g., the additional precoding matrices shown in FIGS. 9A and 9B correspond to PC-4 full-power mode 1). In some aspects, the PC-4/PC-2/NC 8Tx MIMO codebook subset may alternatively be referred to as a PC-4 and PC-2 and NC 8Tx MIMO codebook subset, or simply a PC-4 8Tx MIMO codebook subset. In some aspects, the UE 120 may be configured to use the PC-4/PC-2/NC 8Tx MIMO codebook subset by a codebook subset parameter (e.g., codebookSubset). Put another way, in some aspects, the UE 120 may be configured to use the additional precoding matrices shown in FIG. 11 when the UE 120 is configured to use full-power mode (e.g., ULFPTx is enabled and ULFPTxModes=mode 1) and the UE 120 is configured to use the PC-4/PC-2/NC codebook subset (e.g., codebookSubset=PC-4 and/or PC-4/PC-2/NC).

In such aspects, instead of or in addition to the precoding matrices described in connection with FIGS. 9A-10, the UE 120 may be configured with at least one additional precoding matrix for rank 1 of the PC-4/PC-2/NC codebook, because, as described in connection with FIG. 8, for the PC-4/PC-2/NC codebook subset there is no full power support for this codebook. For example, for rank 1, the UE 120 may be configured with an additional precoding matrix of $$\frac{1}{\sqrt{2}}\begin{bmatrix}W_{4Tx,r=1}\\W'_{4Tx,r=1}\end{bmatrix},$$

where, in this example, $W_{4Tx,r=1}$ and $W'_{4Tx,r=1}$ may be selected from the 4Tx, rank 1 FC precoding codebook subset, which include the precoding matrices indexed as TPMI 12-27 in FIG. 7A (e.g., $$\frac{1}{2}\begin{bmatrix}1\\1\\1\\1\end{bmatrix},\ \frac{1}{2}\begin{bmatrix}1\\1\\j\\j\end{bmatrix},\ \frac{1}{2}\begin{bmatrix}1\\1\\-1\\-1\end{bmatrix},\ \frac{1}{2}\begin{bmatrix}1\\1\\-j\\-j\end{bmatrix},\ \frac{1}{2}\begin{bmatrix}1\\j\\1\\j\end{bmatrix},\ \frac{1}{2}\begin{bmatrix}1\\j\\j\\-1\end{bmatrix},\ \frac{1}{2}\begin{bmatrix}1\\j\\-1\\-j\end{bmatrix},$$

$$\frac{1}{2}\begin{bmatrix}1\\j\\-j\\-1\end{bmatrix},\ \frac{1}{2}\begin{bmatrix}1\\-1\\1\\-1\end{bmatrix},\ \frac{1}{2}\begin{bmatrix}1\\-1\\j\\-j\end{bmatrix},\ \frac{1}{2}\begin{bmatrix}1\\-1\\-1\\1\end{bmatrix},\ \frac{1}{2}\begin{bmatrix}1\\-1\\-j\\j\end{bmatrix},\ \frac{1}{2}\begin{bmatrix}1\\-j\\1\\-j\end{bmatrix},$$

-continued $$\frac{1}{2}\begin{bmatrix}1\\-j\\j\\1\end{bmatrix},\ \frac{1}{2}\begin{bmatrix}1\\-j\\-1\\j\end{bmatrix},\ \frac{1}{2}\begin{bmatrix}1\\-j\\-j\\-1\end{bmatrix}\Bigg),$$

As a result, the additional precoding matrix shown in FIG. 11 may include at least one non-zero element (e.g., 1, −1, j, or −j) in each row, and thus be used by a PC-4/PC-2/NC UE 120 to perform full-power transmissions.

As indicated above, FIG. 11 is provided as an example. Other examples may differ from what is described with regard to FIG. 11.

FIG. 12 is a diagram illustrating an example 1200 of an 8Tx MIMO codebook associated with a permutation matrix, in accordance with the present disclosure.

In some aspects, a UE 120 may be configured with a port-group (PG) configuration, which may indicate groups of antenna ports to be used for uplink transmissions, such as PUSCH communications, with antenna ports within each PG applying the same precoding matrix. For example, a UE 120 may be configured by an RRC communication or the like with one SRS resource set, with 8-port SRS resources in the SRS resource set, and with a PG configuration of two 4-port groups. More particularly, in some implementations, a first PG may include antenna ports 0, 1, 2, and 3, and a second PG may include antenna ports 4, 5, 6, and 7. In some other aspects, different antenna ports may belong to different groups. For example, as shown in FIG. 12, a first PG may include antenna ports 0, 1, 4, and 5, and a second PG may include antenna ports 2, 3, 6, and 7. In some aspects, the first PG (e.g., antenna ports 0, 1, 4, and 5 in the depicted example) may apply a first precoding matrix, and the second PG (e.g., antenna ports 0, 1, 4, and 5 in the depicted example) may apply a second precoding matrix, different from the first precoding matrix.

In such aspects, a specific permutation matrix (sometimes referred to as $P_G$) may be introduced to represent the PG configuration. More particularly, in some aspects, $P_G$ may be equal to $[e_{1,1}, e_{1,2}, e_{1,3}, e_{1,4}, e_{2,1}, e_{2,2}, e_{2,3}, e_{2,4}]$, where $e_{i,j}$ corresponds to a unit vector with a single non-zero (unit) element to represent the j-th port in PG i. For example, and as shown in FIG. 12, when PG 1 includes antenna ports 0, 1, 4, and 5, and when PG 2 includes antenna ports 2, 3, 6, and 7, $P_G$ may be equal to $$\begin{bmatrix}1&0&0&0&0&0&0&0\\0&1&0&0&0&0&0&0\\0&0&0&0&1&0&0&0\\0&0&0&0&0&1&0&0\\0&0&1&0&0&0&0&0\\0&0&0&1&0&0&0&0\\0&0&0&0&0&0&1&0\\0&0&0&0&0&0&0&1\end{bmatrix}.$$

In such aspects, the uplink precoding matrix may be determined by multiplying $P_G$ to the front of the default 8Tx precoding matrices (described in connection with FIG. 8) and/or to the front of the full-power 8Tx precoding matrices (described in connection with FIGS. 9A-11).

For example, and as shown in FIG. 12, the default precoding matrices would and for rank 1, Type 1:

$$\frac{1}{\sqrt{2}}P_G\begin{bmatrix}W_{4Tx,r=1}\\0\end{bmatrix};$$

and for rank 1, Type 2:

$$\frac{1}{\sqrt{2}}P_G\begin{bmatrix}0\\W_{4Tx,r=1}\end{bmatrix}.$$

Moreover, the default precoding matrices would become for rank 2, Type 1:

$$\frac{1}{\sqrt{2}}P_G\begin{bmatrix}W_{4Tx,r=2}\\0\end{bmatrix};$$

for rank 2, Type 2;

$$\frac{1}{\sqrt{2}}P_G\begin{bmatrix}0\\W_{4Tx,r=2}\end{bmatrix};$$

and for rank 2, Type 3:

$$\frac{1}{\sqrt{2}}P_G\begin{bmatrix}W_{4Tx,r=1}&0\\0&W'_{4Tx,r=1}\end{bmatrix}.$$

Moreover, the default precoding matrices would become for rank 3, Type 1:

$$\frac{1}{\sqrt{2}}P_G\begin{bmatrix}W_{4Tx,r=3}\\0\end{bmatrix};$$

for rank 3, Type 2:

$$\frac{1}{\sqrt{2}}P_G\begin{bmatrix}0\\W_{4Tx,r=3}\end{bmatrix};$$

for rank 3, Type 3:

$$\frac{1}{\sqrt{2}}P_G\begin{bmatrix}W_{4Tx,r=2}&0\\0&W_{4Tx,r=1}\end{bmatrix};$$

and for rank 3, Type 4:

$$\frac{1}{\sqrt{2}}P_G\begin{bmatrix}W_{4Tx,r=1}&0\\0&W_{4Tx,r=2}\end{bmatrix}.$$

The default precoding matrices would become for rank 4, Type 1:

$$\frac{1}{\sqrt{2}}P_G\begin{bmatrix}W_{4Tx,r=4}\\0\end{bmatrix};$$

for rank 4, Type 2:

$$\frac{1}{\sqrt{2}}P_G\begin{bmatrix}0\\W_{4Tx,r=4}\end{bmatrix};$$

for rank 4, Type 3:

$$\frac{1}{\sqrt{2}}P_G\begin{bmatrix}W_{4Tx,r=2}&0\\0&W'_{4Tx,r=4}\end{bmatrix};$$

for rank 4, Type 4:

$$\frac{1}{\sqrt{2}}P_G\begin{bmatrix}W_{4Tx,r=3}&0\\0&W_{4Tx,r=1}\end{bmatrix};$$

and for rank 4, Type 5:

$$\frac{1}{\sqrt{2}}P_G\begin{bmatrix}W_{4Tx,r=1}&0\\0&W_{4Tx,r=3}\end{bmatrix}.$$

Still more, the default precoding matrices would become for rank 5, Type 1:

$$\frac{1}{\sqrt{2}}P_G\begin{bmatrix}W_{4Tx,r=3}&0\\0&W_{4Tx,r=2}\end{bmatrix};$$

for rank 5, Type 2:

$$\frac{1}{\sqrt{2}}P_G\begin{bmatrix}W_{4Tx,r=2}&0\\0&W_{4Tx,r=3}\end{bmatrix};$$

for rank 5, Type 3:

$$\frac{1}{\sqrt{2}}P_G\begin{bmatrix}W_{4Tx,r=4}&0\\0&W_{4Tx,r=1}\end{bmatrix},$$

and for rank 5, Type 4:

$$\frac{1}{\sqrt{2}}P_G\begin{bmatrix}W_{4Tx,r=1}&0\\0&W_{4Tx,r=4}\end{bmatrix}.$$

The default precoding matrices would become for rank 6, Type 1:

$$\frac{1}{\sqrt{2}}P_G\begin{bmatrix}W_{4Tx,r=3}&0\\0&W_{4Tx,r=3}\end{bmatrix};$$

for rank 6, Type 2:

$$\frac{1}{\sqrt{2}}P_G\begin{bmatrix}W_{4Tx,r=4}&0\\0&W_{4Tx,r=2}\end{bmatrix};$$

for rank 6, Type 3:

$$\frac{1}{\sqrt{2}}P_G\begin{bmatrix}W_{4Tx,r=2}&0\\0&W_{4Tx,r=4}\end{bmatrix}.$$

Moreover, the default precoding matrices would become for rank 7, Type 1:

$$\frac{1}{\sqrt{2}}P_G\begin{bmatrix} W_{4Tx,r=4} & 0 \\ 0 & W_{4Tx,r=3} \end{bmatrix};$$

and for rank 7, Type 2:

$$\frac{1}{\sqrt{2}}P_G\begin{bmatrix} W_{4Tx,r=3} & 0 \\ 0 & W_{4Tx,r=4} \end{bmatrix}.$$

And the default precoding matrices would become for rank 8, type 1:

$$\frac{1}{\sqrt{2}}P_G\begin{bmatrix} W_{4Tx,r=4} & 0 \\ 0 & W'_{4Tx,r=4} \end{bmatrix}.$$

In aspects including the PG configuration, the additional precoding matrices described in connection with FIGS. 9A-11 for full-power mode configurations may similarly be multiplied by $P_G$.

As indicated above, FIG. 12 is provided as an example. Other examples may differ from what is described with regard to FIG. 12.

FIG. 13 is a diagram illustrating an example 1300 of signaling associated with an 8Tx MIMO codebook, in accordance with the present disclosure.

In some aspects, a network entity may indicate to a UE 120 that an 8Tx MIMO full-power mode should be used and/or the network entity may indicate or more precoding matrices to be used for an 8Tx MIMO full-power mode. For example, in some aspects a UE 120 may be configured with a subset restriction of one of a PC-4/PC-2/NC codebook subset, a PC-2/NC codebook subset, or an NC codebook subset (e.g., codebookSubset is set to one of PC-4/PC-2/NC, PC-2/NC, or NC), and the UE 120 may be configured to operate in a full-power mode 1 (e.g., ULFPTx is enable and ULFPTxModes is set to mode 1). In such aspects, the network entity may signal to the UE 120 whether a full-power precoding matrix should be used using a DCI field and/or a DCI state.

For example, in some aspects, a DCI communication may include a one-bit field indicating whether to use a full-power precoding matrix (e.g., one of the precoding matrices described in connection with FIGS. 9A-11) or whether to use a default precoding matrix (e.g., one of the precoding matrices described in connection with FIG. 8). More particularly, in some aspects, when the one-bit field indicates one of a 0 or a 1 bit, the two TPMI fields, together with the SRS resource set indicator and/or the two SRI fields (as described in connection with FIGS. 6A-6C), may be used to indicate a default precoding matrix, and when the one-bit field indicates the other one of a 0 or 1 bit, the two TPMI fields, together with the SRS resource set indicator and/or the two SRI fields, may be used to indicate a full-power precoding matrix.

In some other aspects, one of the SRI fields may be used to indicate whether to use a full-power precoding matrix (e.g., one of the precoding matrices described in connection with FIGS. 9A-11) or whether to use a default precoding matrix (e.g., one of the precoding matrices described in connection with FIG. 8). More particularly, a first SRI field may be used to indicate an SRS resource, with one of a 0 or a 1 bit indicating that an SRS resource indexed as 0 in the first SRS resource set and/or an SRS resource indexed as 0 in the second SRS resource set should be used, and with the other one of a 0 or a 1 bit indicating that an SRS resource indexed as 1 in the first SRS resource set and/or an SRS resource indexed as 1 in the second SRS resource set should be used. Moreover, a second SRI field may be used to indicate whether to use full-power precoding matrices or default precoding matrices, with one of a 0 or a 1 bit indicating that the two TPMI fields, together with the SRS resource set indicator, are used to indicate a default precoding matrix, and with the other one of a 0 or a 1 bit indicating that the two TPMI fields, together with the SRS resource set indicator, are used to indicate a full-power precoding matrix.

In some other aspects, the SRS resource set indicator may be used to indicate whether to use a full-power precoding matrix (e.g., one of the precoding matrices described in connection with FIGS. 9A-11) or whether to use a default precoding matrix (e.g., one of the precoding matrices described in connection with FIG. 8). For example, and as shown in FIG. 13, if the SRS resource set indicator (which, in some aspects, may be a two-bit filed) indicates one of 0, 1, or 2, a default precoding matrix may be used, with the particular default precoding matrix chosen as indicated by the two TPMI fields. And if the SRS resource set indicator indicates 3, a full-power precoding matrix may be used, with the particular full-power precoding matrix chosen as indicated by the two TPMI fields.

As indicated above, FIG. 13 is provided as an example. Other examples may differ from what is described with regard to FIG. 13.

Figure 14:
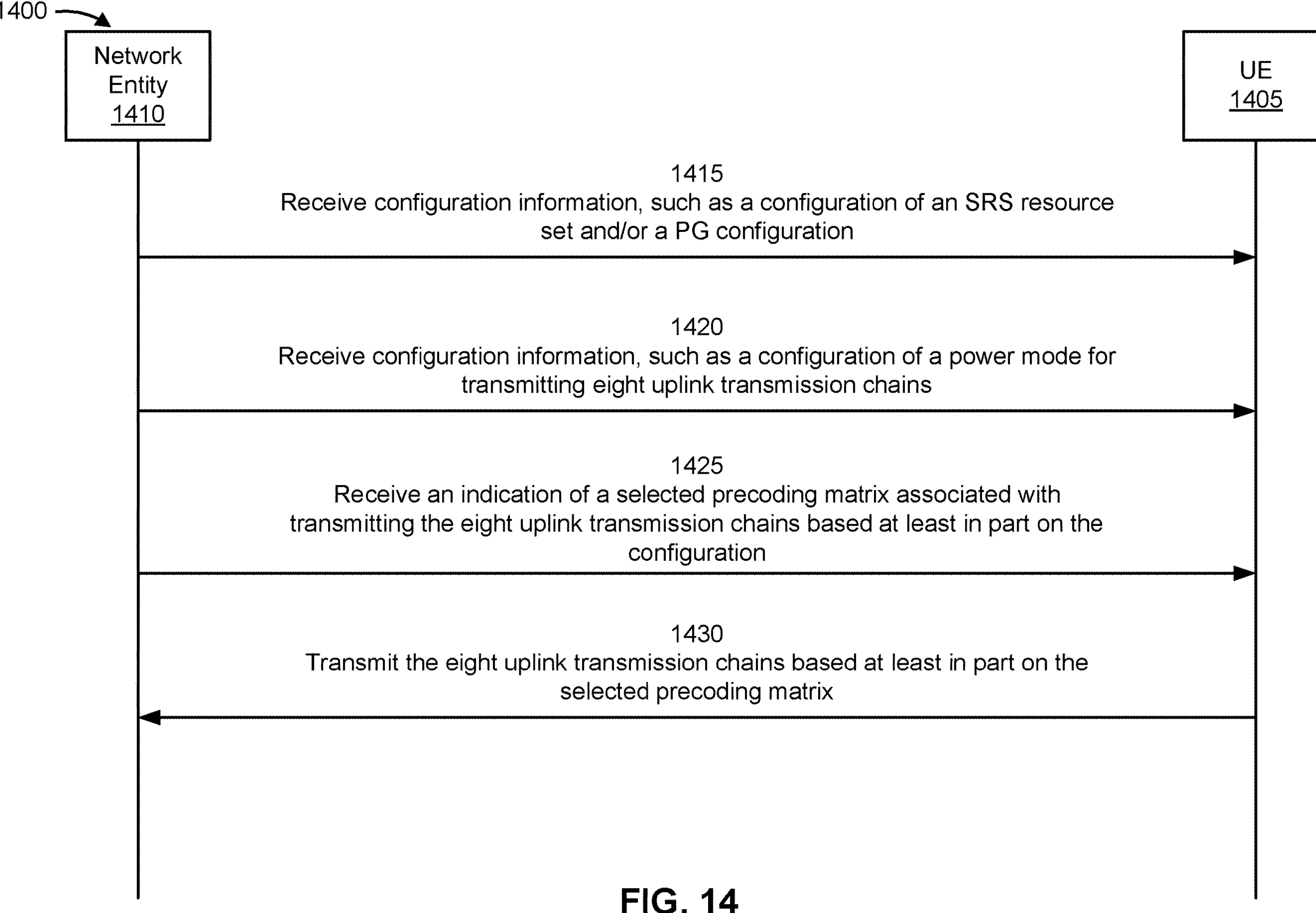
FIG. 14 is a diagram of an example associated with precoding matrices for 8Tx MIMO full-power transmissions, in accordance with the present disclosure.

FIG. 14 is a diagram of an example 1400 associated with precoding matrices for 8Tx MIMO full-power transmissions, in accordance with the present disclosure. As shown in FIG. 14, a UE 1405 (e.g., UE 120) and a network entity 1410 (e.g., a base station 110, a CU 310, a DU 330, an RU 340, or a similar network entity) may communicate with one another. In some aspects, the UE 1405 and the network entity 1410 may be part of a wireless network (e.g., wireless network 100). The UE 1405 and the network entity 1410 may have established a wireless connection prior to operations shown in FIG. 14.

As shown by reference numbers 1415 and 1420, the network entity 1410 may transmit, and the UE 1405 may receive, configuration information. In some aspects, the UE 1405 may receive the configuration information via one or more of RRC signaling, one or more MAC-CEs, and/or DCI, among other examples. In some aspects, the configuration information may include an indication of one or more configuration parameters (e.g., already known to the UE 1405 and/or previously indicated by the network entity 1410 or other network device) for selection by the UE 1405, and/or explicit configuration information for the UE 1405 to use to configure the UE 1405, among other examples. The UE 1405 may configure itself based at least in part on the configuration information. In some aspects, the UE 1405 may be configured to perform one or more operations described herein based at least in part on the configuration information.

In some aspects, and as shown by reference number 1415, the configuration information may configure one or more SRS resource sets including one or more SRS resources for use by the UE 1405, as described in connection with FIGS. 4 and 5. Additionally, or alternatively, the configuration of the SRS resource set may include a PG configuration, as described in connection with FIG. 12. For example, the PG configuration may indicate two groups of four SRS ports. Moreover, and as shown by reference number 1420, in some aspects, the configuration information may include a configuration of a power mode for transmitting eight uplink transmission chains. The power mode may be one of a full-power mode (e.g., 8Tx full power mode 1) or a non-full-power mode, with at least a first set of precoding matrices associated with the full-power mode and at least a second set of precoding matrices associated with the non-full-power mode. For example, the default 8Tx precoding matrices described in connection FIG. 8 may be associated with the non-full-power mode and thus correspond to the second set of precoding matrices, and/or the additional full-power precoding matrices described in connection with FIGS. 9A-11 may be associated with the full-power mode and thus correspond to the first set of precoding matrices. In some aspects, and as described in connection with FIGS. 8-11, the first set of precoding matrices and the second set of precoding matrices may be based at least in part on a four uplink transmission chain codebook (e.g., the precoding matrices may be based at least in part on $W_{4Tx,r=R}$).

As shown by reference number 1425, in some aspects, the UE 1405 may receive, from the network entity 1410, an indication of a selected precoding matrix associated with transmitting the eight uplink transmission chains. For example, in aspects in which the UE 1405 will transmit using the non-full-power mode, the selected precoding matrix may be one of the set of precoding matrices described in connection with the default precoding matrices in FIG. 8. And in aspects in which the UE 1405 will transmit using the full-power mode, the selected precoding matrix may be one of the set of precoding matrices described in connection with the default precoding matrices in FIG. 8 that support full power transmission, or else one of the set of additional precoding matrices described in connection with FIGS. 9A-11. In that regard, in some aspects, the indication is based at least in part on the configuration of the power mode (e.g., whether the UE 1405 is to transmit in the full-power mode or the non-full-power mode) and one of the first set of precoding matrices or the second set of precoding matrices.

In some aspects, the configuration information described in connection with reference number 1415 and/or 1420 may include a configuration of a codebook subset. For example, in some aspects, the configuration may indicate one of an NC precoding matrices subset, a PC-2/NC precoding matrices subset, or PC-4/PC-2/NC precoding matrices subset. In such aspects, the indication of the selected precoding matrix may be further based at least in part on the configuration of the codebook subset, as described in connection with FIGS. 9A-11. For example, when the configuration of the codebook subset indicates an NC precoding matrices subset, the selected precoding matrix may be selected from the additional precoding matrices described in connection with FIGS. 9A and 9B. Similarly, when the configuration of the codebook subset indicates a PC-2/NC precoding matrices subset or a PC-4/PC-2/NC precoding matrices subset, the selected precoding matrix may be selected from the additional precoding matrices described in connection with FIGS. 10 and 11, respectively.

Moreover, in some aspects, the indication of the selected precoding matrix associated with transmitting the eight uplink transmission chains may include a rank indicator. The rank indicator may indicate whether the UE 1405 should transmit with one or more layers (up to eight). In aspects in which the codebook subset is the NC precoding matrices subset, the first set of precoding matrices (e.g., the set of matrices associated with the full-power mode) may be associated with a rank indicator of one through seven, because the rank 1-7 NC default codebook subset may not support full-power transmission, as described in connection with FIGS. 9A-9B. The first set of precoding matrices may not be associated with a rank indicator of 8, because at least one rank 8 matrix associated with the second set of precoding matrices (e.g., the default precoding matrices) may support 8Tx full-power transmission. Similarly, when the codebook subset is the PC-2/NC precoding matrices subset, the first set of precoding matrices may associated with a rank indicator of one through three (because the rank 1-3 PC-2/NC default codebook subset may not support full-power transmission, as described in connection with FIG. 10), and when the codebook subset is the PC-4/PC-2/NC precoding matrices subset, the first set of precoding matrices may be associated with a rank indicator of one (because the rank 1 PC-4/PC-2/NC default codebook subset may not support full-power transmission, as described in connection with FIG. 11).

In some aspects, the indication shown by reference number 1425 may be received via a DCI communication. Moreover, the DCI communication may include additional indications, such as an indication of whether to use the first set of precoding matrices or the second set of precoding matrices. As described in connection with FIG. 13, in some aspects, the indication of whether to use the first set of precoding matrices or the second set of precoding matrices may be indicated using one bit. In such aspects, when the one bit is equal to one of 0 or 1, two TPMI fields may indicate one or more TPMIs associated with the first set of precoding matrices (e.g., the full-power precoding matrices), and when the one bit is equal to the other one of 0 or 1, the two TPMI fields indicate one or more TPMIs associated with the second set of precoding matrices (e.g., the default precoding matrices).

Alternatively, the indication of whether to use the first set of precoding matrices or the second set of precoding matrices may be indicated using an SRI field in the DCI communication. For example, a first SRI field may indicate one or more SRS resources in one or more SRS resource sets to be used by the UE 1405, and a second SRI field may indicate whether to use the first set of precoding matrices or the second set of precoding matrices. Alternatively, the indication of whether to use the first set of precoding matrices or the second set of precoding matrices may be indicated using an SRS resource set indicator in the DCI communication. For example, when the SRS resource set indicator indicates one of a type 0 indication, a type 1 indication, or a type 2 indication, the two TPMI fields may indicate one or more TPMIs associated with the second set of precoding matrices (e.g., the default precoding matrices), and when the SRS resource set indicator indicates a type 3 indication, the two TPMI fields may indicate one or more TPMIs associated with the first set of precoding matrices (e.g., the full-power precoding matrices), as described in connection with FIG. 13.

As shown by reference number 1430, in some aspects, the UE 1405 may transmit, to the network entity 1410, the eight uplink transmission chains based at least in part on the selected precoding matrix. In aspects in which the UE 1405 is configured to use a full-power precoding matrix (e.g., one of the default precoding matrices that supports full-power transmission or else one of the additional full-power precoding matrices), transmitting the eight uplink transmission chains using the full-power precoding matrix may improve coverage at a cell edge, or the like. Moreover, in aspects in which the UE 1405 received the PG configuration, transmitting the eight uplink transmission chains may be further based at least in part on a specific permutation matrix associated with the port-group configuration, such as the matrix $P_G$ described in connection with FIG. 12. More particularly, in such aspects, the selected precoding matrix may be multiplied by the specific permutation matrix.

As indicated above, FIG. 14 is provided as an example. Other examples may differ from what is described with respect to FIG. 14.

Figure 15:
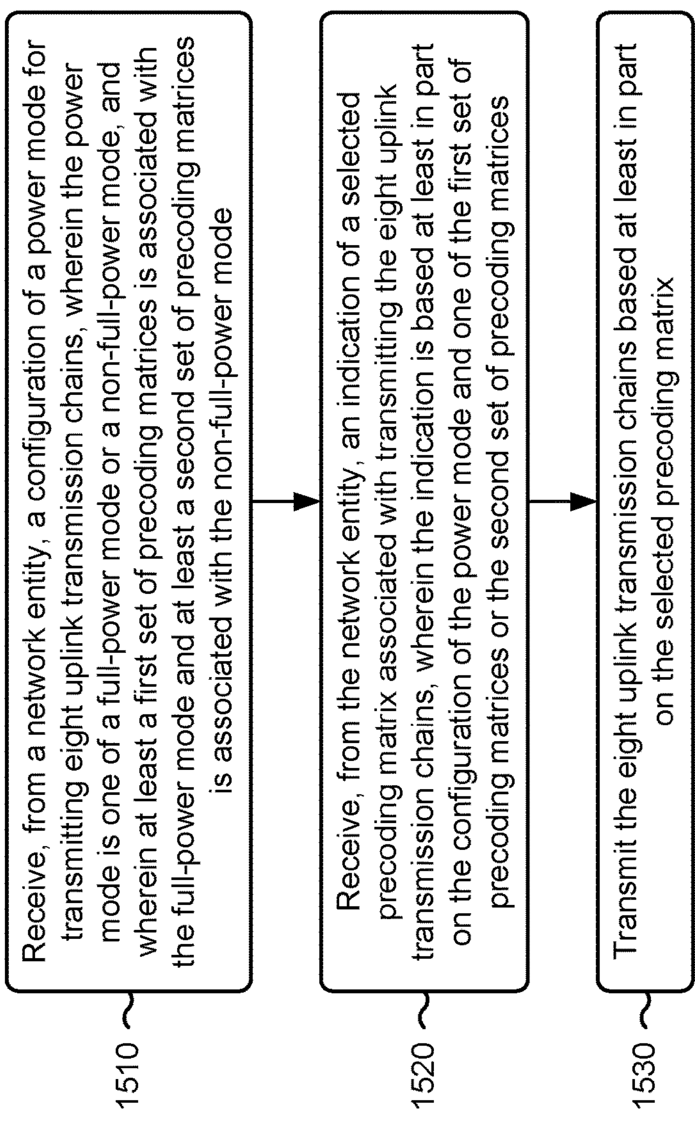
FIG. 15 is a diagram illustrating an example process performed, for example, by a UE, in accordance with the present disclosure.

FIG. 15 is a diagram illustrating an example process 1500 performed, for example, by a UE, in accordance with the present disclosure. Example process 1500 is an example where the UE (e.g., UE 1405) performs operations associated with 8Tx precoding matrices for full-power uplink transmissions.

As shown in FIG. 15, in some aspects, process 1500 may include receiving, from a network entity, a configuration of a power mode for transmitting eight uplink transmission chains, wherein the power mode is one of a full-power mode or a non-full-power mode, and wherein at least a first set of precoding matrices is associated with the full-power mode and at least a second set of precoding matrices is associated with the non-full-power mode (block 1510). For example, the UE (e.g., using communication manager 1708 and/or reception component 1702, depicted in FIG. 17) may receive, from a network entity, a configuration of a power mode for transmitting eight uplink transmission chains, wherein the power mode is one of a full-power mode or a non-full-power mode, and wherein at least a first set of precoding matrices is associated with the full-power mode and at least a second set of precoding matrices is associated with the non-full-power mode, as described above.

As further shown in FIG. 15, in some aspects, process 1500 may include receiving, from the network entity, an indication of a selected precoding matrix associated with transmitting the eight uplink transmission chains, wherein the indication is based at least in part on the configuration of the power mode and one of the first set of precoding matrices or the second set of precoding matrices (block 1520). For example, the UE (e.g., using communication manager 1708 and/or reception component 1702, depicted in FIG. 17) may receive, from the network entity, an indication of a selected precoding matrix associated with transmitting the eight uplink transmission chains, wherein the indication is based at least in part on the configuration of the power mode and one of the first set of precoding matrices or the second set of precoding matrices, as described above.

As further shown in FIG. 15, in some aspects, process 1500 may include transmitting the eight uplink transmission chains based at least in part on the selected precoding matrix (block 1530). For example, the UE (e.g., using communication manager 1708 and/or transmission component 1704, depicted in FIG. 17) may transmit the eight uplink transmission chains based at least in part on the selected precoding matrix, as described above.

Process 1500 may include additional aspects, such as any single aspect or any combination of aspects described below and/or in connection with one or more other processes described elsewhere herein.

In a first aspect, process 1500 includes receiving, from the network entity, a configuration of a codebook subset, wherein the indication of the selected precoding matrix is further based at least in part on the configuration of the codebook subset.

In a second aspect, alone or in combination with the first aspect, the codebook subset is one of an NC precoding matrices subset, a PC-2/NC precoding matrices subset, or PC-4/PC-2/NC precoding matrices subset.

In a third aspect, alone or in combination with one or more of the first and second aspects, the indication of the selected precoding matrix associated with transmitting the eight uplink transmission chains includes a rank indicator, wherein, when the codebook subset is the NC precoding matrices subset, the first set of precoding matrices is associated with a rank indicator of one through seven, wherein, when the codebook subset is the PC-2/NC precoding matrices subset, the first set of precoding matrices is associated with a rank indicator of one through three, and wherein, when the codebook subset is the PC-4/PC-2/NC precoding matrices subset, the first set of precoding matrices is associated with a rank indicator of one.

In a fourth aspect, alone or in combination with one or more of the first through third aspects, the first set of precoding matrices and the second set of precoding matrices are based at least in part on a four uplink transmission chain codebook.

In a fifth aspect, alone or in combination with one or more of the first through fourth aspects, process 1500 includes receiving, from the network entity, a configuration of a sounding reference signal resource set including a port-group configuration, wherein transmitting the eight uplink transmission chains is further based at least in part on a specific permutation matrix associated with the port-group configuration.

In a sixth aspect, alone or in combination with one or more of the first through fifth aspects, the port-group configuration indicates two groups of four sounding reference signal ports.

In a seventh aspect, alone or in combination with one or more of the first through sixth aspects, the indication of the selected precoding matrix is associated with a DCI communication.

In an eighth aspect, alone or in combination with one or more of the first through seventh aspects, the DCI communication includes an indication of whether to use the first set of precoding matrices or the second set of precoding matrices.

In a ninth aspect, alone or in combination with one or more of the first through eighth aspects, the indication of whether to use the first set of precoding matrices or the second set of precoding matrices is indicated using one bit.

In a tenth aspect, alone or in combination with one or more of the first through ninth aspects, when the one bit is equal to one of 0 or 1, two TPMI fields indicate one or more TPMIs associated with the first set of precoding matrices, and, when the one bit is equal to the other one of 0 or 1, the two TPMI fields indicate one or more TPMIs associated with the second set of precoding matrices.

In an eleventh aspect, alone or in combination with one or more of the first through tenth aspects, the indication of whether to use the first set of precoding matrices or the second set of precoding matrices is indicated using an SRI field.

In a twelfth aspect, alone or in combination with one or more of the first through eleventh aspects, a first SRI field indicates one or more SRS resources in one or more SRS resource sets, and a second SRI field indicates whether to use the first set of precoding matrices or the second set of precoding matrices.

In a thirteenth aspect, alone or in combination with one or more of the first through twelfth aspects, the indication of whether to use the first set of precoding matrices or the second set of precoding matrices is indicated using a SRS resource set indicator.

In a fourteenth aspect, alone or in combination with one or more of the first through thirteenth aspects, when the SRS resource set indicator indicates one of a type 0 indication, a type 1 indication, or a type 2 indication, two TPMI fields indicate one or more TPMIs associated with the second set of precoding matrices, and when the SRS resource set indicator indicates a type 3 indication, the two TPMI fields indicate one or more TPMIs associated with the first set of precoding matrices.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
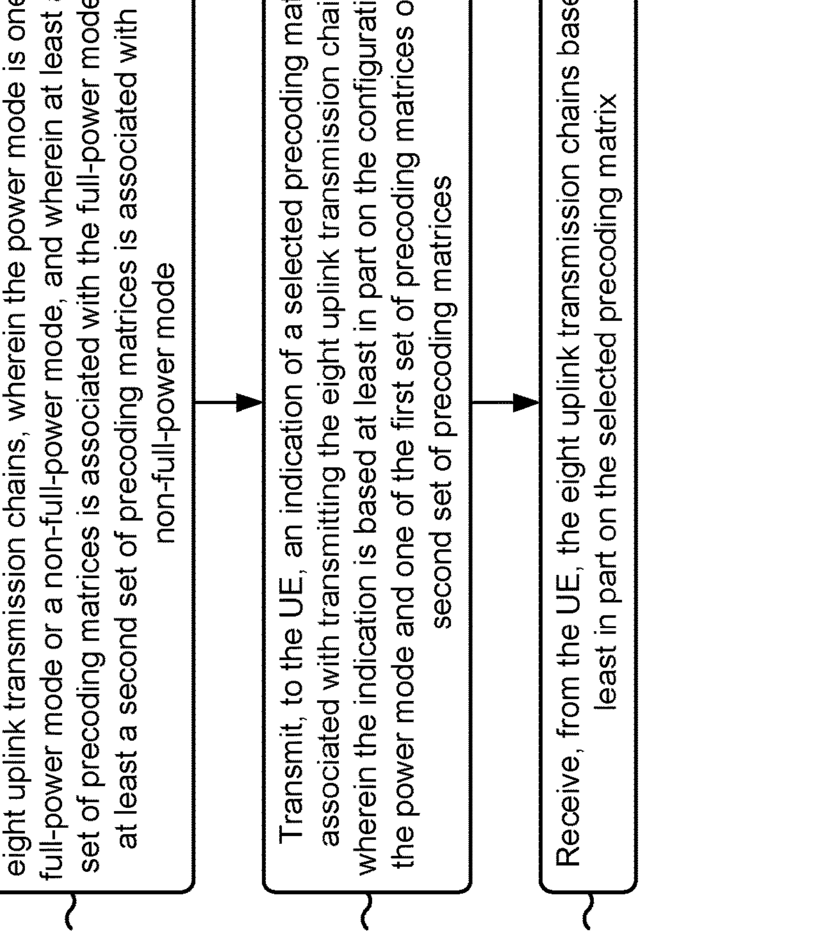
FIG. 16 is a diagram illustrating an example process performed, for example, by a network entity, in accordance with the present disclosure.

FIG. 16 is a diagram illustrating an example process 1600 performed, for example, by a network entity, in accordance with the present disclosure. Example process 1600 is an example where the network entity (e.g., network entity 1410) performs operations associated with 8Tx precoding matrices for full-power uplink transmissions.

As shown in FIG. 16, in some aspects, process 1600 may include transmitting, to a UE (e.g., UE 1405), a configuration of a power mode for transmitting eight uplink transmission chains, wherein the power mode is one of a full-power mode or a non-full-power mode, and wherein at least a first set of precoding matrices is associated with the full-power mode and at least a second set of precoding matrices is associated with the non-full-power mode (block 1610). For example, the network entity (e.g., using communication manager 1808 and/or transmission component 1804, depicted in FIG. 18) may transmit, to a UE, a configuration of a power mode for transmitting eight uplink transmission chains, wherein the power mode is one of a full-power mode or a non-full-power mode, and wherein at least a first set of precoding matrices is associated with the full-power mode and at least a second set of precoding matrices is associated with the non-full-power mode, as described above.

As further shown in FIG. 16, in some aspects, process 1600 may include transmitting, to the UE, an indication of a selected precoding matrix associated with transmitting the eight uplink transmission chains, wherein the indication is based at least in part on the configuration of the power mode and one of the first set of precoding matrices or the second set of precoding matrices (block 1620). For example, the network entity (e.g., using communication manager 1808 and/or transmission component 1804, depicted in FIG. 18) may transmit, to the UE, an indication of a selected precoding matrix associated with transmitting the eight uplink transmission chains, wherein the indication is based at least in part on the configuration of the power mode and one of the first set of precoding matrices or the second set of precoding matrices, as described above.

As further shown in FIG. 16, in some aspects, process 1600 may include receiving, from the UE, the eight uplink transmission chains based at least in part on the selected precoding matrix (block 1630). For example, the network entity (e.g., using communication manager 1808 and/or reception component 1802, depicted in FIG. 18) may receive, from the UE, the eight uplink transmission chains based at least in part on the selected precoding matrix, as described above.

Process 1600 may include additional aspects, such as any single aspect or any combination of aspects described below and/or in connection with one or more other processes described elsewhere herein.

In a first aspect, process 1600 includes transmitting, to the UE, a configuration of a codebook subset, wherein the indication of the selected precoding matrix is further based at least in part on the configuration of the codebook subset.

In a second aspect, alone or in combination with the first aspect, the codebook subset is one of an NC precoding matrices subset, a PC-2/NC precoding matrices subset, or PC-4/PC-2/NC precoding matrices subset.

In a third aspect, alone or in combination with one or more of the first and second aspects, the indication of the selected precoding matrix associated with transmitting the eight uplink transmission chains includes a rank indicator, wherein, when the codebook subset is the NC precoding matrices subset, the first set of precoding matrices is associated with a rank indicator of one through seven, wherein, when the codebook subset is the PC-2/NC precoding matrices subset, the first set of precoding matrices is associated with a rank indicator of one through three, and wherein, when the codebook subset is the PC-4/PC-2/NC precoding matrices subset, the first set of precoding matrices is associated with a rank indicator of one.

In a fourth aspect, alone or in combination with one or more of the first through third aspects, the first set of precoding matrices and the second set of precoding matrices are based at least in part on a four uplink transmission chain codebook.

In a fifth aspect, alone or in combination with one or more of the first through fourth aspects, process 1600 includes transmitting, to the UE, a configuration of a sounding reference signal resource set including a port-group configuration, wherein transmitting the eight uplink transmission chains is further based at least in part on a specific permutation matrix associated with the port-group configuration.

In a sixth aspect, alone or in combination with one or more of the first through fifth aspects, the port-group configuration indicates two groups of four sounding reference signal ports.

In a seventh aspect, alone or in combination with one or more of the first through sixth aspects, the indication of the selected precoding matrix is associated with a DCI communication.

In an eighth aspect, alone or in combination with one or more of the first through seventh aspects, the DCI communication includes an indication of whether to use the first set of precoding matrices or the second set of precoding matrices.

In a ninth aspect, alone or in combination with one or more of the first through eighth aspects, the indication of whether to use the first set of precoding matrices or the second set of precoding matrices is indicated using one bit.

In a tenth aspect, alone or in combination with one or more of the first through ninth aspects, when the one bit is equal to one of 0 or 1, two TPMI fields indicate one or more TPMIs associated with the first set of precoding matrices, and wherein, when the one bit is equal to the other one of 0 or 1, the two TPMI fields indicate one or more TPMIs associated with the second set of precoding matrices.

In an eleventh aspect, alone or in combination with one or more of the first through tenth aspects, the indication of whether to use the first set of precoding matrices or the second set of precoding matrices is indicated using an SRI field.

In a twelfth aspect, alone or in combination with one or more of the first through eleventh aspects, a first SRI field indicates one or more SRS resources in one or more SRS resource sets, and wherein a second SRI field indicates whether to use the first set of precoding matrices or the second set of precoding matrices.

In a thirteenth aspect, alone or in combination with one or more of the first through twelfth aspects, the indication of whether to use the first set of precoding matrices or the second set of precoding matrices is indicated using an SRS resource set indicator.

In a fourteenth aspect, alone or in combination with one or more of the first through thirteenth aspects, when the SRS resource set indicator indicates one of a type 0 indication, a type 1 indication, or a type 2 indication, two TPMI fields indicate one or more TPMIs associated with the second set of precoding matrices, and, when the SRS resource set indicator indicates a type 3 indication, the two TPMI fields indicate one or more TPMIs associated with the first set of precoding matrices.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
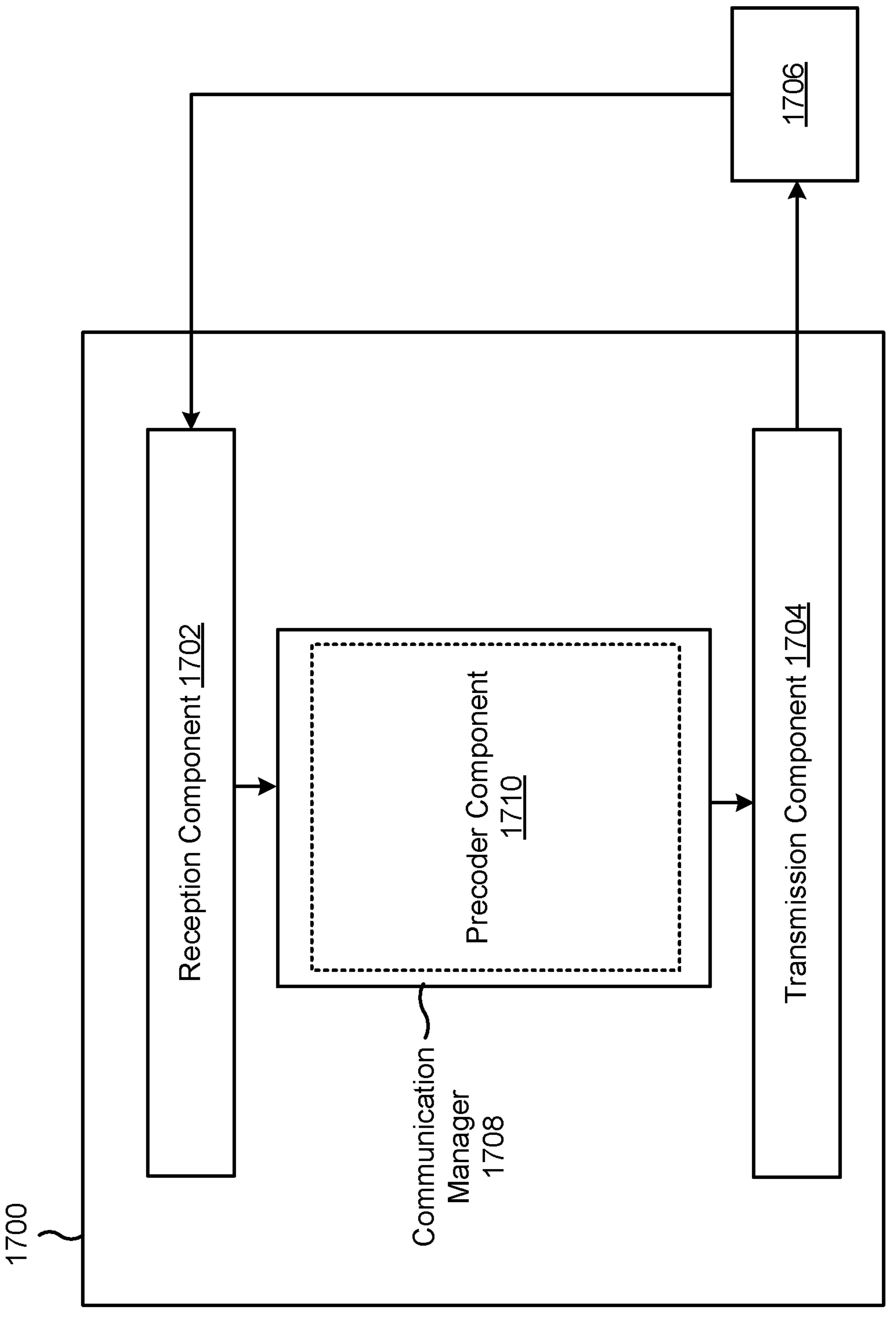
FIG. 17 is a diagram of an example apparatus for wireless communication, in accordance with the present disclosure.

FIG. 17 is a diagram of an example apparatus 1700 for wireless communication, in accordance with the present disclosure. The apparatus 1700 may be a UE (e.g., UE 1405), or a UE may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include the communication manager 1708 (e.g., communication manager 140). The communication manager 1708 may include a precoder component 1710, among other examples.

In some aspects, the apparatus 1700 may be configured to perform one or more operations described herein in connection with FIGS. 8-14. Additionally, or alternatively, the apparatus 1700 may be configured to perform one or more processes described herein, such as process 1500 of FIG. 15. In some aspects, the apparatus 1700 and/or one or more components shown in FIG. 17 may include one or more components of the UE 120 described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the UE 120 described in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the UE 120 described in connection with FIG. 2. In some aspects, the transmission component 1704 may be co-located with the reception component 1702 in a transceiver.

The reception component 1702 and/or the precoder component 1710 may receive, from a network entity (e.g., network entity 1410), a configuration of a power mode for transmitting eight uplink transmission chains, wherein the power mode is one of a full-power mode or a non-full-power mode, and wherein at least a first set of precoding matrices is associated with the full-power mode and at least a second set of precoding matrices is associated with the non-full-power mode. The reception component 1702 and/or the precoder component 1710 may receive, from the network entity, an indication of a selected precoding matrix associated with transmitting the eight uplink transmission chains, wherein the indication is based at least in part on the configuration of the power mode and one of the first set of precoding matrices or the second set of precoding matrices. The transmission component 1704 and/or the precoder component 1710 may transmit the eight uplink transmission chains based at least in part on the selected precoding matrix.

The reception component 1702 and/or the precoder component 1710 may receive, from the network entity, a configuration of a codebook subset, wherein the indication of the selected precoding matrix is further based at least in part on the configuration of the codebook subset.

The reception component 1702 may receive, from the network entity, a configuration of a sounding reference signal resource set including a port-group configuration, wherein transmitting the eight uplink transmission chains is further based at least in part on a specific permutation matrix associated with the port-group configuration.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
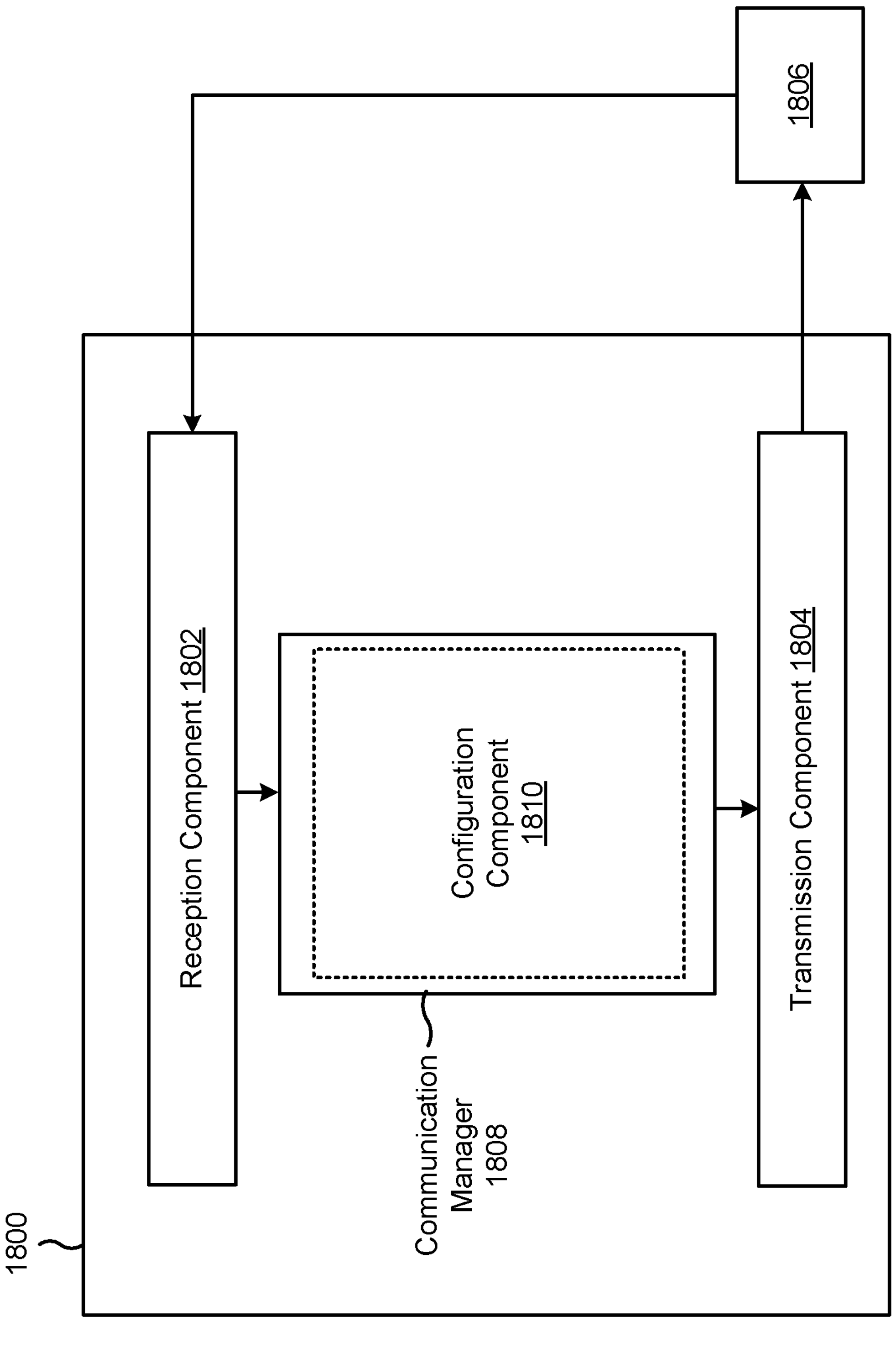
FIG. 18 is a diagram of an example apparatus for wireless communication, in accordance with the present disclosure.

FIG. 18 is a diagram of an example apparatus 1800 for wireless communication, in accordance with the present disclosure. The apparatus 1800 may be a network entity (e.g., network entity 1410), or a network entity may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804. As further shown, the apparatus 1800 may include the communication manager 1808 (e.g., communication manager 150). The communication manager 1808 may include a configuration component 1810, among other examples.

In some aspects, the apparatus 1800 may be configured to perform one or more operations described herein in connection with FIGS. 8-14. Additionally, or alternatively, the apparatus 1800 may be configured to perform one or more processes described herein, such as process 1600 of FIG. 16. In some aspects, the apparatus 1800 and/or one or more components shown in FIG. 18 may include one or more components of the base station 110 described in connection with FIG. 2. Additionally, or alternatively, one or more components shown in FIG. 18 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, a modem, a demodulator, a MIMO detector, a receive processor, a controller/processor, a memory, or a combination thereof, of the base station 110 described in connection with FIG. 2.

The transmission component 1804 may transmit communications, such as reference signals, control information, data communications, or a combination thereof, to the apparatus 1806. In some aspects, one or more other components of the apparatus 1800 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modem, a modulator, a transmit MIMO processor, a transmit processor, a controller/processor, a memory, or a combination thereof, of the base station 110 described in connection with FIG. 2. In some aspects, the transmission component 1804 may be co-located with the reception component 1802 in a transceiver.

The transmission component 1804 and/or the configuration component 1810 may transmit, to a UE (e.g., UE 1405), a configuration of a power mode for transmitting eight uplink transmission chains, wherein the power mode is one of a full-power mode or a non-full-power mode, and wherein at least a first set of precoding matrices is associated with the full-power mode and at least a second set of precoding matrices is associated with the non-full-power mode. The transmission component 1804 may transmit, to the UE, an indication of a selected precoding matrix associated with transmitting the eight uplink transmission chains, wherein the indication is based at least in part on the configuration of the power mode and one of the first set of precoding matrices or the second set of precoding matrices. The reception component 1802 may receive, from the UE, the eight uplink transmission chains based at least in part on the selected precoding matrix.

The transmission component 1804 and/or the configuration component 1810 may transmit, to the UE, a configuration of a codebook subset, wherein the indication of the selected precoding matrix is further based at least in part on the configuration of the codebook subset.

The reception component 1802 and/or the configuration component 1810 may transmit, to the UE, a configuration of a sounding reference signal resource set including a port-group configuration, wherein transmitting the eight uplink transmission chains is further based at least in part on a specific permutation matrix associated with the port-group configuration.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

The following provides an overview of some Aspects of the present disclosure:

Aspect 1: A method of wireless communication performed by a UE, comprising: receiving, from a network entity, a configuration of a power mode for transmitting eight uplink transmission chains, wherein the power mode is one of a full-power mode or a non-full-power mode, and wherein at least a first set of precoding matrices is associated with the full-power mode and at least a second set of precoding matrices is associated with the non-full-power mode; receiving, from the network entity, an indication of a selected precoding matrix associated with transmitting the eight uplink transmission chains, wherein the indication is based at least in part on the configuration of the power mode and one of the first set of precoding matrices or the second set of precoding matrices; and transmitting the eight uplink transmission chains based at least in part on the selected precoding matrix.

Aspect 2: The method of Aspect 1, further comprising receiving, from the network entity, a configuration of a codebook subset, wherein the indication of the selected precoding matrix is further based at least in part on the configuration of the codebook subset.

Aspect 3: The method of Aspect 2, wherein the codebook subset is one of an NC precoding matrices subset, a PC-2/NC precoding matrices subset, or a PC-4/PC-2/NC precoding matrices subset.

Aspect 4: The method of Aspect 3, wherein the indication of the selected precoding matrix associated with transmitting the eight uplink transmission chains includes a rank indicator, wherein, when the codebook subset is the NC precoding matrices subset, the first set of precoding matrices is associated with a rank indicator of one through seven, wherein, when the codebook subset is the PC-2/NC precoding matrices subset, the first set of precoding matrices is associated with a rank indicator of one through three, and wherein, when the codebook subset is the PC-4/PC-2/NC precoding matrices subset, the first set of precoding matrices is associated with a rank indicator of one.

Aspect 5: The method of any of Aspects 1-4, wherein the first set of precoding matrices and the second set of precoding matrices are based at least in part on a four uplink transmission chain codebook.

Aspect 6: The method of any of Aspects 1-5, further comprising receiving, from the network entity, a configuration of a sounding reference signal resource set including a port-group configuration, wherein transmitting the eight uplink transmission chains is further based at least in part on a specific permutation matrix associated with the port-group configuration.

Aspect 7: The method of Aspect 6, wherein the port-group configuration indicates two groups of four sounding reference signal ports.

Aspect 8: The method of any of Aspects 1-7, wherein the indication of the selected precoding matrix is associated with a DCI communication.

Aspect 9: The method of Aspect 8, wherein the DCI communication includes an indication of whether to use the first set of precoding matrices or the second set of precoding matrices.

Aspect 10: The method of Aspect 9, wherein the indication of whether to use the first set of precoding matrices or the second set of precoding matrices is indicated using one bit.

Aspect 11: The method of Aspect 10, wherein, when the one bit is equal to one of 0 or 1, two TPMI fields indicate one or more TPMIs associated with the first set of precoding matrices, and wherein, when the one bit is equal to the other one of 0 or 1, the two TPMI fields indicate one or more TPMIs associated with the second set of precoding matrices.

Aspect 12: The method of Aspect 9, wherein the indication of whether to use the first set of precoding matrices or the second set of precoding matrices is indicated using an SRI field.

Aspect 13: The method of Aspect 12, wherein a first SRI field indicates one or more SRS resources in one or more SRS resource sets, and wherein a second SRI field indicates whether to use the first set of precoding matrices or the second set of precoding matrices.

Aspect 14: The method of Aspect 9, wherein the indication of whether to use the first set of precoding matrices or the second set of precoding matrices is indicated using an SRS resource set indicator.

Aspect 15: The method of Aspect 14, wherein, when the SRS resource set indicator indicates one of a type 0 indication, a type 1 indication, or a type 2 indication, two TPMI fields indicate one or more TPMIs associated with the second set of precoding matrices, and wherein, when the SRS resource set indicator indicates a type 3 indication, the two TPMI fields indicate one or more TPMIs associated with the first set of precoding matrices.

Aspect 16: A method of wireless communication performed by a network entity, comprising: transmitting, to a UE, a configuration of a power mode for transmitting eight uplink transmission chains, wherein the power mode is one of a full-power mode or a non-full-power mode, and wherein at least a first set of precoding matrices is associated with the full-power mode and at least a second set of precoding matrices is associated with the non-full-power mode; transmitting, to the UE, an indication of a selected precoding matrix associated with transmitting the eight uplink transmission chains, wherein the indication is based at least in part on the configuration of the power mode and one of the first set of precoding matrices or the second set of precoding matrices; and receiving, from the UE, the eight uplink transmission chains based at least in part on the selected precoding matrix.

Aspect 17: The method of Aspect 16, further comprising transmitting, to the UE, a configuration of a codebook subset, wherein the indication of the selected precoding matrix is further based at least in part on the configuration of the codebook subset.

Aspect 18: The method of Aspect 17, wherein the codebook subset is one of an NC precoding matrices subset, a PC-2/NC precoding matrices subset, or a PC-4/PC-2/NC precoding matrices subset.

Aspect 19: The method of Aspect 18, wherein the indication of the selected precoding matrix associated with transmitting the eight uplink transmission chains includes a rank indicator, wherein, when the codebook subset is the NC precoding matrices subset, the first set of precoding matrices is associated with a rank indicator of one through seven, wherein, when the codebook subset is the PC-2/NC precoding matrices subset, the first set of precoding matrices is associated with a rank indicator of one through three, and wherein, when the codebook subset is the PC-4/PC-2/NC precoding matrices subset, the first set of precoding matrices is associated with a rank indicator of one.

Aspect 20: The method of any of Aspects 16-19, wherein the first set of precoding matrices and the second set of precoding matrices are based at least in part on a four uplink transmission chain codebook.

Aspect 21: The method of any of Aspects 16-20, further comprising transmitting, to the UE, a configuration of a sounding reference signal resource set including a port-group configuration, wherein transmitting the eight uplink transmission chains is further based at least in part on a specific permutation matrix associated with the port-group configuration.

Aspect 22: The method of Aspect 21, wherein the port-group configuration indicates two groups of four sounding reference signal ports.

Aspect 23: The method of any of Aspects 16-22, wherein the indication of the selected precoding matrix is associated with a DCI communication.

Aspect 24: The method of Aspect 23, wherein the DCI communication includes an indication of whether to use the first set of precoding matrices or the second set of precoding matrices.

Aspect 25: The method of Aspect 24, wherein the indication of whether to use the first set of precoding matrices or the second set of precoding matrices is indicated using one bit.

Aspect 26: The method of Aspect 25, wherein, when the one bit is equal to one of 0 or 1, two TPMI fields indicate one or more TPMIs associated with the first set of precoding matrices, and wherein, when the one bit is equal to the other one of 0 or 1, the two TPMI fields indicate one or more TPMIs associated with the second set of precoding matrices.

Aspect 27: The method of Aspect 24, wherein the indication of whether to use the first set of precoding matrices or the second set of precoding matrices is indicated using an SRI field.

Aspect 28: The method of Aspect 27, wherein a first SRI field indicates one or more SRS resources in one or more SRS resource sets, and wherein a second SRI field indicates whether to use the first set of precoding matrices or the second set of precoding matrices.

Aspect 29: The method of Aspect 24, wherein the indication of whether to use the first set of precoding matrices or the second set of precoding matrices is indicated using an SRS resource set indicator.

Aspect 30: The method of Aspect 29, wherein, when the SRS resource set indicator indicates one of a type 0 indication, a type 1 indication, or a type 2 indication, two TPMI fields indicate one or more TPMIs associated with the second set of precoding matrices, and wherein, when the SRS resource set indicator indicates a type 3 indication, the two TPMI fields indicate one or more TPMIs associated with the first set of precoding matrices.

Aspect 31: An apparatus for wireless communication at a device, comprising a processor; memory coupled with the processor; and instructions stored in the memory and executable by the processor to cause the apparatus to perform the method of one or more of Aspects 1-15.

Aspect 32: A device for wireless communication, comprising a memory and one or more processors coupled to the memory, the one or more processors configured to perform the method of one or more of Aspects 1-15.

Aspect 33: An apparatus for wireless communication, comprising at least one means for performing the method of one or more of Aspects 1-15.

Aspect 34: A non-transitory computer-readable medium storing code for wireless communication, the code comprising instructions executable by a processor to perform the method of one or more of Aspects 1-15.

Aspect 35: A non-transitory computer-readable medium storing a set of instructions for wireless communication, the set of instructions comprising one or more instructions that, when executed by one or more processors of a device, cause the device to perform the method of one or more of Aspects 1-15.

Aspect 36: An apparatus for wireless communication at a device, comprising a processor; memory coupled with the processor; and instructions stored in the memory and executable by the processor to cause the apparatus to perform the method of one or more of Aspects 16-30.

Aspect 37: A device for wireless communication, comprising a memory and one or more processors coupled to the memory, the one or more processors configured to perform the method of one or more of Aspects 16-30.

Aspect 38: An apparatus for wireless communication, comprising at least one means for performing the method of one or more of Aspects 16-30.

Aspect 39: A non-transitory computer-readable medium storing code for wireless communication, the code comprising instructions executable by a processor to perform the method of one or more of Aspects 16-30.

Aspect 40: A non-transitory computer-readable medium storing a set of instructions for wireless communication, the set of instructions comprising one or more instructions that, when executed by one or more processors of a device, cause the device to perform the method of one or more of Aspects 16-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and one or more processors, coupled to the one or more memories, configured to:

receive, from a network entity, a configuration of a power mode for transmitting using eight uplink transmission chains, wherein the power mode is one of a full-power mode or a non-full-power mode, and wherein at least a first set of precoding matrices is associated with the full-power mode and at least a second set of precoding matrices is associated with the non-full-power mode;

receive, from the network entity, an indication of a selected precoding matrix associated with transmitting using the eight uplink transmission chains, wherein the indication is based at least in part on the configuration of the power mode and one of the first set of precoding matrices or the second set of precoding matrices;

receive, from the network entity, a configuration of a codebook subset, wherein the indication of the selected precoding matrix is further based at least in part on the configuration of the codebook subset, wherein the codebook subset is one of a non-coherent (NC) precoding matrices subset, a partially coherent for two ports (PC-2) precoding matrices subset, or a partially coherent for four ports (PC-4) precoding matrices subset, wherein the indication of the selected precoding matrix associated with transmitting using the eight uplink transmission chains includes a rank indicator, wherein, when the codebook subset is the NC precoding matrices subset, the first set of precoding matrices is associated with a rank indicator of one through seven, wherein, when the codebook subset is the PC-2 precoding matrices subset, the first set of precoding matrices is associated with a rank indicator of one through three, and wherein, when the codebook subset is the PC-4 precoding matrices subset, the first set of precoding matrices is associated with a rank indicator of one; and transmit using the eight uplink transmission chains based at least in part on the selected precoding matrix.

2. The apparatus of claim 1, wherein the first set of precoding matrices and the second set of precoding matrices are based at least in part on a four uplink transmission chain codebook.

3. The apparatus of claim 1, wherein the one or more processors are further configured to receive, from the network entity, a configuration of a sounding reference signal resource set including a port-group configuration, wherein transmitting using the eight uplink transmission chains is further based at least in part on a specific permutation matrix associated with the port-group configuration.

4. The apparatus of claim 3, wherein the port-group configuration indicates two groups of four sounding reference signal ports.

5. The apparatus of claim 1, wherein the indication of the selected precoding matrix is associated with a downlink control information (DCI) communication.

6. The apparatus of claim 5, wherein the DCI communication includes an indication of whether to use the first set of precoding matrices or the second set of precoding matrices.

7. The apparatus of claim 6, wherein the indication of whether to use the first set of precoding matrices or the second set of precoding matrices is indicated using one bit.

8. The apparatus of claim 7, wherein, when the one bit is equal to one of 0 or 1, two transmitted precoding matrix indicator (TPMI) fields indicate one or more TPMIs associated with the first set of precoding matrices, and wherein, when the one bit is equal to the other one of 0 or 1, the two TPMI fields indicate one or more TPMIs associated with the second set of precoding matrices.

9. The apparatus of claim 6, wherein the indication of whether to use the first set of precoding matrices or the second set of precoding matrices is indicated using a sounding reference signal (SRS) resource indicator (SRI) field.

10. The apparatus of claim 9, wherein a first SRI field indicates one or more SRS resources in one or more SRS resource sets, and wherein a second SRI field indicates whether to use the first set of precoding matrices or the second set of precoding matrices.

11. The apparatus of claim 6, wherein the indication of whether to use the first set of precoding matrices or the second set of precoding matrices is indicated using a sounding reference signal (SRS) resource set indicator.

12. The apparatus of claim 11, wherein, when the SRS resource set indicator indicates one of a type 0 indication, a type 1 indication, or a type 2 indication, two transmitted precoding matrix indicator (TPMI) fields indicate one or more TPMIs associated with the second set of precoding matrices, and wherein, when the SRS resource set indicator indicates a type 3 indication, the two TPMI fields indicate one or more TPMIs associated with the first set of precoding matrices.

13. An apparatus for wireless communication at a network entity, comprising:

one or more memories; and one or more processors, coupled to the one or more memories, configured to:

transmit, to a user equipment (UE), a configuration of a power mode for transmitting using eight uplink transmission chains, wherein the power mode is one of a full-power mode or a non-full-power mode, and wherein at least a first set of precoding matrices is associated with the full-power mode and at least a second set of precoding matrices is associated with the non-full-power mode;

transmit, to the UE, an indication of a selected precoding matrix associated with transmitting using the eight uplink transmission chains, wherein the indication is based at least in part on the configuration of the power mode and one of the first set of precoding matrices or the second set of precoding matrices;

transmit, to the UE, a configuration of a codebook subset, wherein the indication of the selected precoding matrix is further based at least in part on the configuration of the codebook subset, wherein the codebook subset is one of a non-coherent (NC) precoding matrices subset, a partially coherent for two ports (PC-2) precoding matrices subset, or a partially coherent for four ports (PC-4) precoding matrices subset, wherein the indication of the selected precoding matrix associated with transmitting using the eight uplink transmission chains includes a rank indicator, wherein, when the codebook subset is the NC precoding matrices subset, the first set of precoding matrices is associated with a rank indicator of one through seven, wherein, when the codebook subset is the PC-2 precoding matrices subset, the first set of precoding matrices is associated with a rank indicator of one through three, and wherein, when the codebook subset is the PC-4 precoding matrices subset, the first set of precoding matrices is associated with a rank indicator of one; and receive, from the UE, transmission using the eight uplink transmission chains based at least in part on the selected precoding matrix.

14. The apparatus of claim 13, wherein the first set of precoding matrices and the second set of precoding matrices are based at least in part on a four uplink transmission chain codebook.

15. The apparatus of claim 13, wherein the indication of the selected precoding matrix is associated with a downlink control information (DCI) communication.

16. The apparatus of claim 15, wherein the DCI communication includes an indication of whether to use the first set of precoding matrices or the second set of precoding matrices.

17. The apparatus of claim 16, wherein the indication of whether to use the first set of precoding matrices or the second set of precoding matrices is indicated using one bit.

18. The apparatus of claim 17, wherein, when the one bit is equal to one of 0 or 1, two transmitted precoding matrix indicator (TPMI) fields indicate one or more TPMIs associated with the first set of precoding matrices, and wherein, when the one bit is equal to the other one of 0 or 1, the two TPMI fields indicate one or more TPMIs associated with the second set of precoding matrices.

19. The apparatus of claim 16, wherein the indication of whether to use the first set of precoding matrices or the second set of precoding matrices is indicated using a sounding reference signal (SRS) resource indicator (SRI) field.

20. The apparatus of claim 19, wherein a first SRI field indicates one or more SRS resources in one or more SRS resource sets, and wherein a second SRI field indicates whether to use the first set of precoding matrices or the second set of precoding matrices.

21. The apparatus of claim 16, wherein the indication of whether to use the first set of precoding matrices or the second set of precoding matrices is indicated using a sounding reference signal (SRS) resource set indicator.

22. The apparatus of claim 21, wherein, when the SRS resource set indicator indicates one of a type 0 indication, a type 1 indication, or a type 2 indication, two transmitted precoding matrix indicator (TPMI) fields indicate one or more TPMIs associated with the second set of precoding matrices, and wherein, when the SRS resource set indicator indicates a type 3 indication, the two TPMI fields indicate one or more TPMIs associated with the first set of precoding matrices.

23. A method of wireless communication performed by a user equipment (UE), comprising:

receiving, from a network entity, a configuration of a power mode for transmitting using eight uplink transmission chains, wherein the power mode is one of a full-power mode or a non-full-power mode, and wherein at least a first set of precoding matrices is associated with the full-power mode and at least a second set of precoding matrices is associated with the non-full-power mode;

receiving, from the network entity, an indication of a selected precoding matrix associated with transmitting using the eight uplink transmission chains, wherein the indication is based at least in part on the configuration of the power mode and one of the first set of precoding matrices or the second set of precoding matrices;

receiving, from the network entity, a configuration of a codebook subset, wherein the indication of the selected precoding matrix is further based at least in part on the configuration of the codebook subset, wherein the codebook subset is one of a non-coherent (NC) precoding matrices subset, a partially coherent for two ports (PC-2) precoding matrices subset, or a partially coherent for four ports (PC-4) precoding matrices subset, wherein the indication of the selected precoding matrix associated with transmitting using the eight uplink transmission chains includes a rank indicator, wherein, when the codebook subset is the NC precoding matrices subset, the first set of precoding matrices is associated with a rank indicator of one through seven, wherein, when the codebook subset is the PC-2 precoding matrices subset, the first set of precoding matrices is associated with a rank indicator of one through three, and wherein, when the codebook subset is the PC-4 precoding matrices subset, the first set of precoding matrices is associated with a rank indicator of one; and transmitting using the eight uplink transmission chains based at least in part on the selected precoding matrix.

24. The method of claim 23, wherein the first set of precoding matrices and the second set of precoding matrices are based at least in part on a four uplink transmission chain codebook.

25. The method of claim 23, wherein the indication of the selected precoding matrix is associated with a downlink control information (DCI) communication.

26. The method of claim 25, wherein the DCI communication includes an indication of whether to use the first set of precoding matrices or the second set of precoding matrices.

27. A method of wireless communication performed by a network entity, comprising:

transmitting, to a user equipment (UE), a configuration of a power mode for transmitting using eight uplink transmission chains, wherein the power mode is one of a full-power mode or a non-full-power mode, and wherein at least a first set of precoding matrices is associated with the full-power mode and at least a second set of precoding matrices is associated with the non-full-power mode;

transmitting, to the UE, an indication of a selected precoding matrix associated with transmitting using the eight uplink transmission chains, wherein the indication is based at least in part on the configuration of the power mode and one of the first set of precoding matrices or the second set of precoding matrices;

transmitting, to the UE, a configuration of a codebook subset, wherein the indication of the selected precoding matrix is further based at least in part on the configuration of the codebook subset, wherein the codebook subset is one of a non-coherent (NC) precoding matrices subset, a partially coherent for two ports (PC-2) precoding matrices subset, or a partially coherent for four ports (PC-4) precoding matrices subset, wherein the indication of the selected precoding matrix associated with transmitting using the eight uplink transmission chains includes a rank indicator, wherein, when the codebook subset is the NC precoding matrices subset, the first set of precoding matrices is associated with a rank indicator of one through seven, wherein, when the codebook subset is the PC-2 precoding matrices subset, the first set of precoding matrices is associated with a rank indicator of one through three, and wherein, when the codebook subset is the PC-4 precoding matrices subset, the first set of precoding matrices is associated with a rank indicator of one; and receiving, from the UE, transmission using the eight uplink transmission chains based at least in part on the selected precoding matrix.

28. The method of claim 27, wherein the first set of precoding matrices and the second set of precoding matrices are based at least in part on a four uplink transmission chain codebook.

29. The method of claim 27, wherein the indication of the selected precoding matrix is associated with a downlink control information (DCI) communication.

30. The method of claim 29, wherein the DCI communication includes an indication of whether to use the first set of precoding matrices or the second set of precoding matrices.

* * * * *